(12) United States Patent
Asada

(10) Patent No.: US 7,325,646 B2
(45) Date of Patent: Feb. 5, 2008

(54) ELECTRIC POWER STEERING APPARATUS

(75) Inventor: Atsuhisa Asada, Obu (JP)

(73) Assignee: JTEKT Corporation, Osaka (JP)

( * ) Notice: Subject to any disclaimer, the term of this patent is extended or adjusted under 35 U.S.C. 154(b) by 259 days.

(21) Appl. No.: 11/182,000

(22) Filed: Jul. 15, 2005

(65) Prior Publication Data

US 2007/0012506 A1 Jan. 18, 2007

(51) Int. Cl.
*B62D 5/04* (2006.01)

(52) U.S. Cl. ...................... 180/444; 180/446

(58) Field of Classification Search ........ 180/444, 180/443, 446; 701/41
See application file for complete search history.

(56) References Cited

U.S. PATENT DOCUMENTS

| | | | |
|---|---|---|---|
| 5,067,577 A | 11/1991 | Morishita |
| 5,072,166 A | 12/1991 | Ehsani |
| 5,786,754 A | 7/1998 | Parker |
| 5,845,222 A | 12/1998 | Yamamoto et al. |
| 5,880,367 A | 3/1999 | Vaughn |
| 5,930,905 A | 8/1999 | Zabler et al. |
| 5,978,721 A | 11/1999 | Kagawa et al. |
| 6,008,599 A | 12/1999 | Beck |
| 6,354,396 B1 | 3/2002 | Horton et al. |
| 6,364,050 B1 | 4/2002 | Horton |
| 6,469,499 B2 | 10/2002 | Delaporte |
| 6,519,549 B1 | 2/2003 | Lin et al. |
| 6,597,141 B1 | 7/2003 | Wilson-Jones et al. |
| 2002/0040531 A1 | 4/2002 | Schodlbauer |
| 2004/0210366 A1 | 10/2004 | Tomita |
| 2005/0016789 A1 | 1/2005 | Asada |

FOREIGN PATENT DOCUMENTS

| | | |
|---|---|---|
| DE | 197 12 869 A1 | 10/1998 |
| DE | 101 37 098 A1 | 2/2002 |
| EP | 1 026 068 A2 | 8/2000 |
| EP | 1 193 472 A2 | 4/2002 |
| JP | 59-226806 | 12/1984 |
| JP | 7-2135 | 1/1995 |

*Primary Examiner*—Tony Winner
(74) *Attorney, Agent, or Firm*—Oblon, Spivak, McClelland, Maier & Neustadt, P.C.

(57) ABSTRACT

In an electric power steering apparatus, at least one of a speed reduction gear ratio of the speed reduction gear mechanism and the number of pole pairs of a motor resolver is set in such a manner that a calculated value, which is obtained by multiplying the speed reduction gear ratio of the speed reduction gear mechanism with the number of pole pairs of the motor resolver, represents a non-integer having a numerical value of the decimal place. This electric power steering apparatus includes an absolute rotational position specifying device configured to specify an absolute rotational position of the steering wheel from among plural possible absolute rotational positions that are obtained based on the steering angle and the motor electrical angle. This electric power steering apparatus is hence capable of controlling an electric motor based on the absolute rotational position of the steering wheel.

9 Claims, 22 Drawing Sheets

Numerical Value of Decimal Place of Calculated Value (r)

Numerical Value of Decimal Place of Calculated Value (r)

ELECTRIC POWER STEERING APPARATUS

FIELD OF THE INVENTION

This invention relates to an electric power steering apparatus.

BACKGROUND

There is a conventionally known electric power steering apparatus, according to which an extent of a steering force needed for operating a steering wheel can be reduced by applying an assist force by a motor to a steering mechanism connected to a steering shaft. In this type of electric power steering apparatus, a steering wheel is rotated, within a limited rotational range, more than one turn (cf. one turn is 360 degrees) in a clockwise direction and more than one turn (cf. one turn is 360 degrees) in a counterclockwise direction. When a vehicle runs straight ahead, the steering wheel is defined to be positioned at a neutral steering position. A steering angle of the steering wheel is grasped by detecting, as an absolute steering position, a rotational position of the steering wheel on a basis of a degree of angle from this neutral steering position.

The aforementioned steering angle of the steering wheel can be detected, for example, by a rotation angle sensor, which is configured with a slit disc rotatable together with a steering shaft, and a photo interrupter. For example, by employing a structure such as "a steering angle sensor and a power steering device" disclosed in pages 2-8 and FIGS. 1-4 of Japanese Laid Open Patent Publication No. 2002-145095A, it is possible to precisely detect a neutral steering position of a steering wheel by use of a single rotation angle sensor.

In general, a steering wheel of a vehicle is not capable of controlling, only by its one turn (cf. one turn is 360 degrees) or less, an angle of a steered wheel within an entire steered angle. For example, if the steering wheel is rotated, from a neutral steering position, two turns (cf. two turns are 720 degrees) in a clockwise direction and two turns (cf. two turns are 720 degrees) in a counterclockwise direction, i.e., if the steering wheel is rotated plus or minus 720 degrees from a neutral steering position, an actual angle of a steered wheel can be freely controlled within a predetermined steered angle. For this reason, even where a mechanism such as "the steering angle sensor and the power steering device" disclosed in JP2002-145095A is employed, it is not possible to detect an absolute steering position of a steering wheel only by use of a single rotation angle sensor. In the light of the foregoing, it is necessary to detect an absolute steering position of a steering wheel in combination with plural rotation angle sensors. Meanwhile, a structure, in which the multiple number of rotation angle sensors are provided, however, directly results in an increase in a manufacturing cost, and a failure rate, of a power steering device, such that it appears to be a reality that this type of structure, which may cause an increase in the number of components, is not favorable to be employed.

Another electric power steering apparatus has also been known, wherein there are employed a resolver as means for detecting the rotational position of an electric motor which generates the assisting force and another resolver as means for detecting the steering torque generated by a steering wheel. However, it was found through researches of the present inventor that it may occur independent on some angular positions of the steering wheel that the latter known electric power steering apparatus cannot precisely distinguish some absolute rotational positions from others precisely or definitely.

SUMMARY OF THE INVENTION

According to an aspect of claim 1 of the present invention, an electric power steering apparatus includes: a steering wheel; a steering shaft connected to the steering wheel; a steering angle sensor for detecting a rotational angle of the steering shaft; an electric motor for assisting, through a speed reduction gear mechanism, a steering operation performed by a steering mechanism connected to the steering shaft; and a motor resolver for detecting a motor electrical angle indicating a rotational angle of the electric motor. The electric power steering apparatus is capable of controlling the electric motor based on an absolute rotational position of the steering wheel, the absolute rotational position which is calculated based on the steering angles and the motor electrical angle. At least one of a speed reduction gear ratio of the speed reduction gear mechanism and the number of pole pairs of the motor resolver is set in such a manner that a calculated value, which is obtained by multiplying the speed reduction gear ratio of the speed reduction gear mechanism with the number of pole pairs of the motor resolver, represents a non-integer having a numerical value of the decimal place. This electric power steering apparatus further includes an absolute rotational position specifying device configured to specify an absolute rotational position of the steering wheel from among plural possible absolute rotational positions that are obtained based on the steering angle and the motor electrical angle.

According to an aspect of claim 2 of the present invention, the electric power steering apparatus further includes: a first resolver for detecting a first steering angle indicating a rotational angle of the steering shaft; and a second resolver having pole pairs different in number from those of the first resolver, the second resolver for detecting a second steering angle indicating a rotational angle of the steering shaft.

According to an aspect of claim 3, wherein the electric power steering apparatus further includes: a rotational range restraining device configured to restrain a rotation of the steering wheel within a predetermined rotational range at a time that an ignition switch has been made off; and a memory configured to memorize, as an IG-off absolute rotational position, an absolute rotational position of the steering wheel which is obtained based on the steering angles and the motor electrical angle immediately before making the ignition switch off; and after making the ignition switch on, the absolute rotational position specifying device specifies, based on the latest IG-off absolute rotational position memorized by the memory and the predetermined rotational range of the steering wheel restrained by the rotational range restraining device, an absolute rotational position of the steering wheel from among plural possible absolute rotational positions that are this time obtained based on the steering angles and the motor electrical angle.

Therefore, even where an absolute rotational position of the steering wheel is needed to be specified from among the plural possible absolute rotational positioned, it is possible to precisely detect an absolute rotational position of the steering wheel, and further to control the motor to assist a steering manipulation of the steering wheel on the basis of the absolute rotational position of the steering wheel detected in this manner.

According to another aspect of claim 4 of the present invention, the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left. The predetermined rotational range of the steering wheel, which is restrained by the rotational range restraining device, is less than 360 degrees. The plural possible absolute rotational positions appear within the two-rotational range to the right and the two-rotational range to the left. It is further preferable that the calculated value is designed to be the non-integer having a numerical value of the decimal place, the numerical value which ranges between 0.22 and 0.39, or between 0.61 and 0.78.

According to still another aspect of claim 5 of the present invention, the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left. The predetermined rotational range of the steering wheel, which is restrained by the rotational range restraining device, is less than 180 degrees. The plural possible absolute rotational positions appear "within the one-rotational range to the right and the two-rotational range to the left" and "within the two-rotational range to the right and within the one-rotational range to the left". It is further preferable that the calculated value is designed to be the non-integer having a numerical value of the decimal place, the numerical value which ranges between 0.33 and 0.67.

According to still another aspect of claim 6 of the present invention, the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left. The absolute rotational position of the steering wheel, which is obtained from the steering angles and the motor electrical angle, is specified from among two possible absolute rotational positions. At an event that one of the two possible absolute rotational positions do not appear at any of the two-rotational range to the left, the one-rotational range to the left, the one-rotational range to the right, and the two-rotational range to the right, and the other one of the two possible absolute rotational positions appears at any of the tow-rotational range to the left, the one-rotational range to the left, the one-rotational range to the right, and the two-rotational range to the right, the absolute rotational position specifying device specifies the other one of the two possible absolute rotational positions as the absolute rotational position of the steering wheel.

According to still another aspect of claim 7, the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left. The absolute rotational position of the steering wheel, which is obtained from the steering angles and the motor electrical angle, is specified from among two possible absolute rotational positions. Where both the two possible absolute rotational positions appear at any of the two-rotational range to the left, the one-rotational range to the left, the one-rotational range to the right, and the two-rotational range to the right, at an event that one of the two possible absolute rotational positions disappears, in response to rotation of the steering wheel beyond a predetermined angle, at any of the two-rotational range to the left, the one-rotational range to the left, the one-rotational range to the right, and the two-rotational range to the right, the absolute rotational position specifying device specifies the other one of the two possible absolute rotational positions as the absolute rotational position of the steering wheel.

According to still another aspect of claim 8, the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left. The absolute rotational position of the steering wheel, which is obtained from the steering angles and the motor electrical angle, is specified from among two possible absolute rotational positions. The electric power steering apparatus further includes a vehicle wheel speed detecting device configured to detect a rotational speed of respective left and right vehicle wheels; and a steering direction judging device configured to judge a steering direction of the steering wheel on the basis of a difference between the rotational speeds of the left and right vehicle wheels detected by the vehicle wheel speed detecting device. The absolute rotational position specifying device specifies, based on the steering direction judged by the steering direction-judging device, the absolute rotational position of the steering wheel from among the two possible absolute rotational positions.

According to another aspect of claim 9, an electric power steering apparatus includes a steering wheel; a steering shaft connected to the steering wheel; a steering angle detecting means for detecting a rotational angle of the steering shaft; an electric motor for assisting, through a speed reduction gear mechanism, a steering operation performed by a steering mechanism connected to the steering shaft; and a motor resolver for detecting a motor electrical angle indicating a rotational angle of the electric motor. The electric power steering apparatus is capable of controlling the electric motor based on an absolute rotational position of the steering wheel, the absolute rotational position which is calculated based on the steering angle and the motor electrical angle. At least one of a speed reduction gear ratio of the speed reduction gear mechanism and the number of pole pairs of the motor resolver is set in such a manner that a calculated value, which is obtained by multiplying the speed reduction gear ratio of the speed reduction gear mechanism with the number of pole pairs of the motor resolver, represents a non-integer having a numerical value of the decimal place. The electric power steering apparatus further includes an absolute rotational position specifying means for specifying an absolute rotational position of the steering wheel from among plural possible absolute rotational positions that are obtained based on the steering angle and the motor electrical angle.

BRIEF DESCRIPTION OF THE DRAWINGS

The foregoing and additional features and characteristics of the present invention will become more apparent from the following detailed description considered with reference to the accompanying drawings, wherein:

FIG. 16A explains in connection with "N3-type", and FIGS. 16B and 16C explain in connection with "N2-type";

FIG. 19A is an explanatory view for explaining that one of absolute steering angles $\theta Am(1)$ and $\theta Am(-2)$ exists outside a range R to R, in which the steering wheel can rotate, immediately after making an IGSW on, FIG. 19B is an explanatory view for explaining that both of absolute steering angles $\theta Am(1)$ and $\theta Am(-2)$ exists inside the range R to R immediately after making the IGSW on, and FIG. 19C is both of absolute steering angles $\theta Am(1)$ and $\theta Am(-2)$ are shifted outside the range R to R in response to rotation of the steering wheel beyond a predetermined rotational angle range after making the IGSW on;

DETAILED DESCRIPTION

An entire content of the U.S. Patent Application Publication No. 2005/0016789 (Ser. No. 10/691,543) published on Jan. 27, 2005 is incorporated herein by reference.

Hereafter, an electric power steering apparatus according to embodiments of the present invention will be described with reference to the accompanying drawings.

In the electric power steering apparatus according to the invention described in the above incorporated U.S. Patent Application Publication, the calculated value r, which is obtained by multiplying a speed reduction gear ratio of a ball screw mechanism 50 with the number of pole pairs of a motor resolver 44, is set in such a manner that a numerical value of the decimal place of the calculated value r is set to 0.17 to 0.28, 0.39 to 0.42, 0.58 to 0.61 or 0.72 to 0.83. On the other hand, in the electric power steering apparatus according to the first embodiment of the present invention, the calculated value r is set to 0.33 or 0.50. It is the essential requirement that the product is to be a non-integer with a numerical value of the decimal place. In this particular embodiment, when the number of pole pairs of the motor resolver 44 is set to 7 for example, the speed reduction gear ratio of the ball screw mechanism 50 (i.e., a speed reduction gear mechanism) can be set to 8.19 for example. In this case, the calculated value r becomes 57.33 (=8.19×7), and the numerical value of the decimal place is 0.33.

Figure 8:
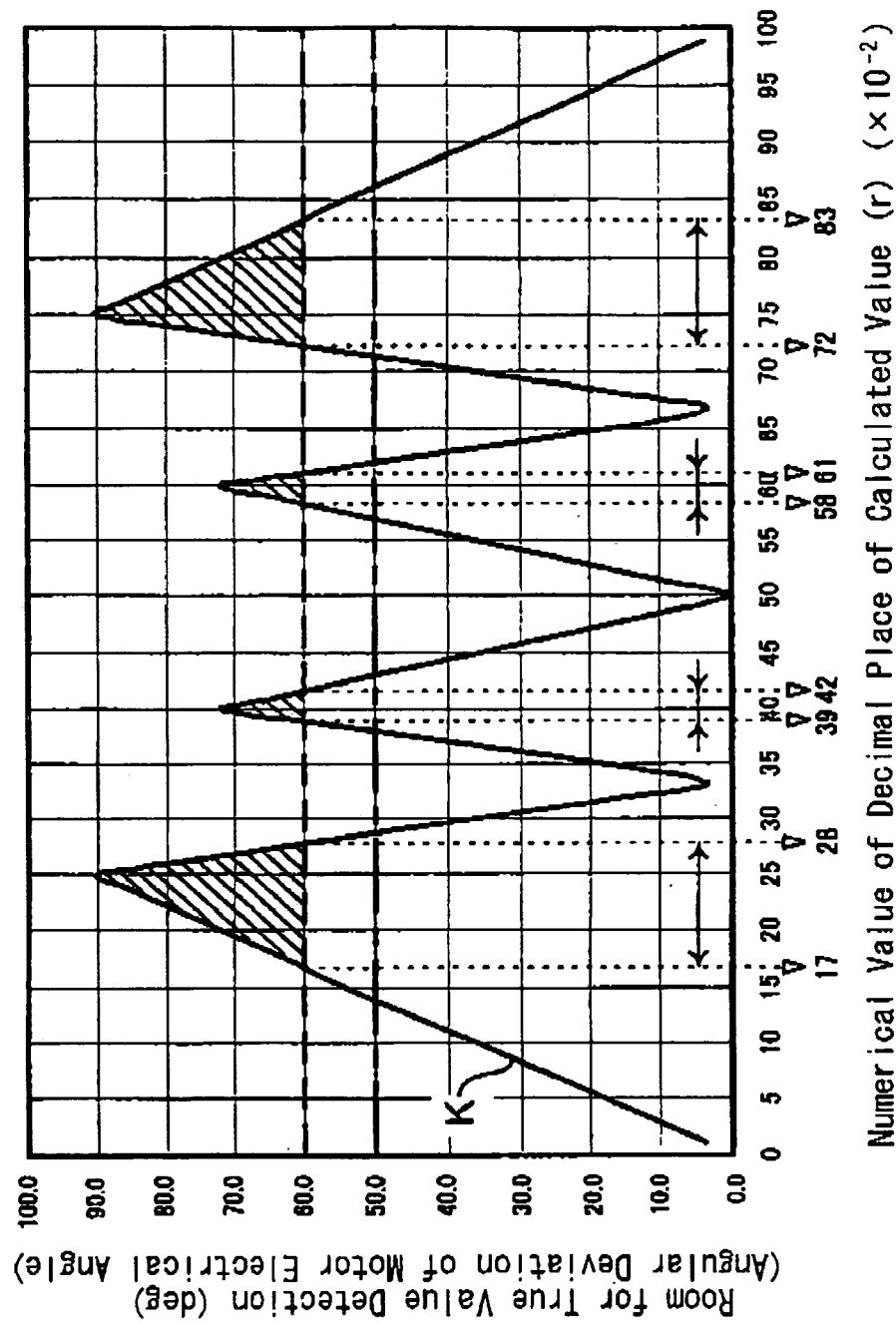
FIG. 8 is a characteristic graph (zigzag line K) showing the variation of a room for true-value detection in connection with a numerical value of the decimal place of the calculated value (r)
Figure 9:
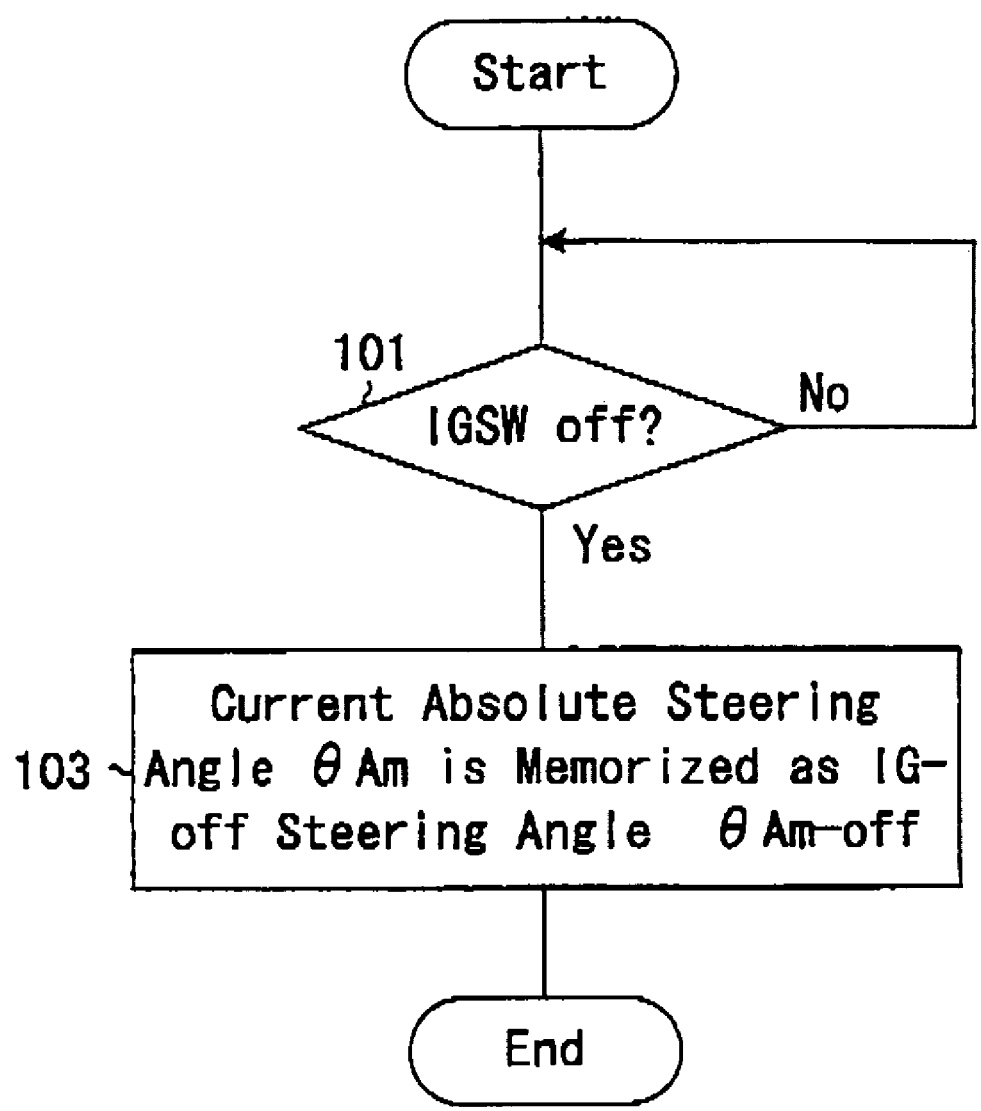
FIG. 9 is a flowchart for explaining an IG-off steering angle memorizing processing according to the first embodiment of the present invention.

FIG. 8 is a characteristic chart that shows the variation of the room for the true value detection in connection with numerical values of the decimal place of the calculated value (r). A zigzag line K in FIG. 8 represents the variation in the room for the true value detection in relation to the variation in the numerical value of the decimal place of the calculated values (r). When the numerical value of the decimal place of the calculated value (r) is set to 0.33 or 0.50, it is possible to increase the room for the true value detection by lifting a peak point of the zigzag line K illustrated in FIG. 8. It is therefore possible to lift an error zone boundary (illustrated as a one-dot chain line in FIG. 8) and a lower limit value for an angular deviation from the calculated motor electrical angle θMe(A). A room (i.e., 60 degrees) for the true value detection calculated in this manner is illustrated as a broken line in FIG. 8.

As described above, in the electric power steering apparatus according to the first embodiment of the present invention, even where an error in dimensional precision of mechanical components, which configure the steering mechanism, is remarkably large, it is possible to detect precisely an absolute steering angle θAm of the steering wheel 21.

Figure 7A:
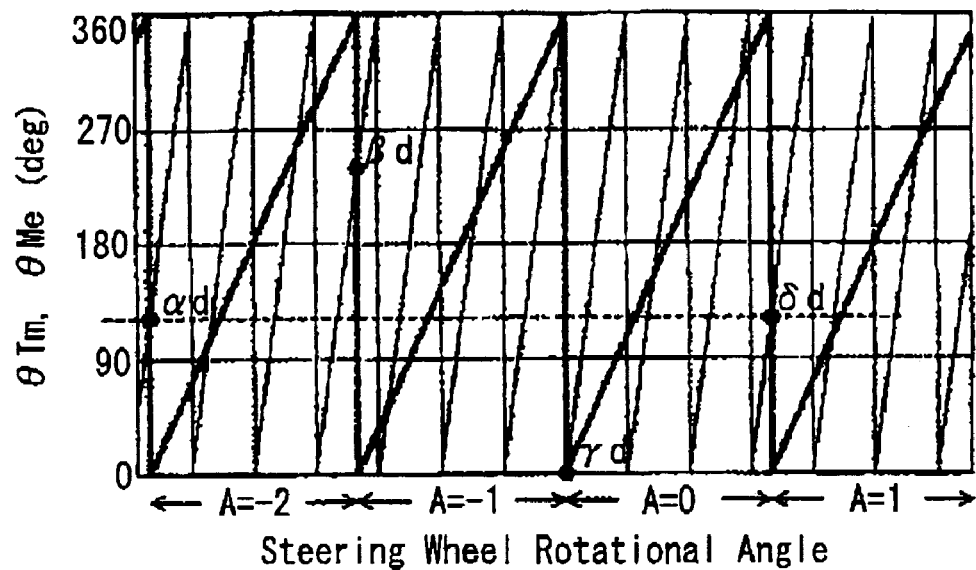
FIG. 7A is a characteristic graph showing the variations of the mechanical angle $\theta Tm$ of a steering wheel and the electrical angle $\theta Me$ of an electric motor in connection with the rotational amount of the steering wheel in the case of a calculated value being (r)=3.33.
Figure 7B:
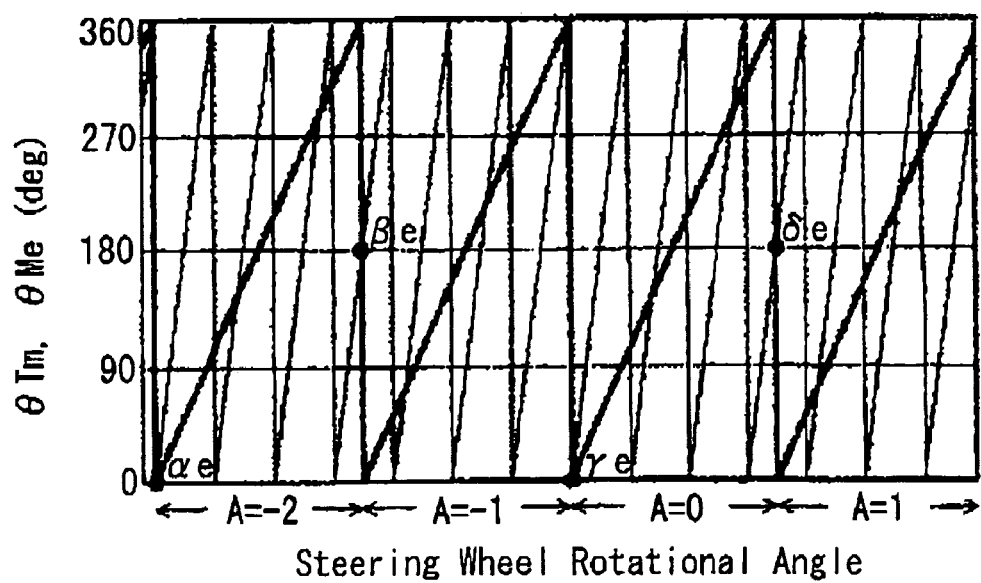
FIG. 7B is another characteristic graph similar to FIG. 7A in the case of the calculated value being (r)=3.5.

However, when the numerical value of the decimal place of the calculated value r is set to 0.33 or 0.50, as is summarized in FIGS. 7A and 7B, some problems may newly occur. In FIGS. 7A and 7B, with respect to the neutral position of the steering wheel 21 as the steering center, one rotational angle (0<θ≦360 degrees) to the right (i.e., in a clockwise direction) is set as A=0, and another successive rotational range (360 degrees<θ≦720 degrees) to the right is set as A=1, while, with respect to the neutral position of the steering wheel 21 as the steering center, one rotational angle (0>θ≧−360 degrees) to the left (i.e., in a counterclockwise direction) is set as A=−1, and another successive rotational range (−360 degrees>θ≧−720 degrees) to the left is set as A=−2.

As is shown in FIG. 7A, where the numerical value of the decimal place of the calculated value r is set to 0.33 (e.g. r=−3.33) for example, values αd and δd, which both have the same value, appear at two locations (A=−2 and A=1). In such circumstances, when either the value αd or δd is a true value, it is not possible to distinguish the true value from among these two values.

As is shown in FIG. 7B, where the numerical value of the decimal place of the calculated value r is set to 0.50 (e.g. r=3.50) for example, a pair of values αe and γe, which both have the same value, appear at two locations (A=−2 and A=0), and the other pair of values βe and δe, which both have the same value, appear at two locations (A=−1 and A=1). Likewise, in such circumstances, when either the value αe or γe, and either the value βe or δe is a true value, it is not possible to distinguish the true value from among these values.

As described above, according to the first embodiment of the present invention, where the numerical value of the decimal place of the calculated value r is set to 0.33 for example, it is possible to detect a rotational amount of the steering wheel 21 within a rotational range A=−2, −1 and 0 or within a rotational range A=−1, 0 and 1. Hereinafter, an electric power steering apparatus, according to which a rotational amount of the steering wheel 21 can be detected at any of four-kind rotational ranges A=−2, −1, 0 and 1, can be referred to as "N4-type", while an electric power steering apparatus, according to which a rotational amount of the steering wheel 21 can be detected either at rotational ranges A=−2, −1 and 0 or at rotational ranges A=−1, 0 and 1, can be referred to as "N3-type".

Further, according to the first embodiment of the present invention, where the numerical value of the decimal place of the calculated value r is set to 0.50 for example, it is possible to detect a rotational amount of the steering wheel 21 within a rotational range A=−2 and −1 or within a rotational range A=0 and 1. Hereinafter, an electric power steering apparatus, according to which a rotational amount of the steering wheel 21 can be detected either at rotational ranges A=−2 and −1 or at rotational ranges A=0 and 1, can be referred to as "N2-type".

Figure 1:
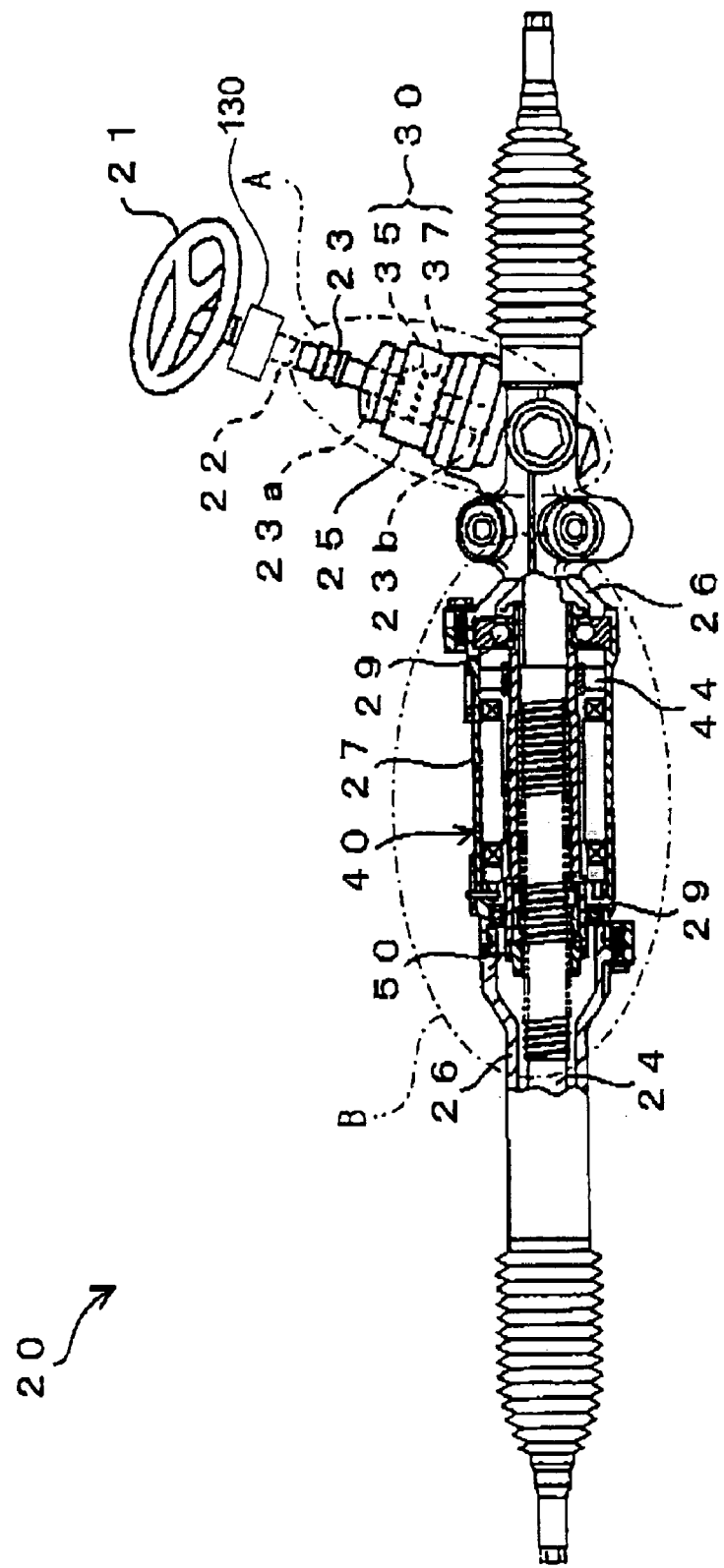
FIG. 1 is an external view partly in section of an electric power steering apparatus according to a first embodiment of the present invention.

In the first place, a structure of an electric power steering apparatus 20 according to the first embodiment of the present invention will be described with reference to FIGS. 1 through 5. As illustrated in FIGS. 1 and 5, the electric power steering apparatus 20 is primarily configured with a steering wheel 21, a steering shaft 22, a pinion shaft 23, a rack shaft 24, a torque sensor 30, an electric motor 40, a motor resolver 44, a ball screw mechanism 50, a lock mechanism 130 mounted half-way of the steering shaft 20, an ECU (an electric control unit) 60, an ignition switch sensor (IGSW sensor) 163 electrically connected to the ECU 60 so as to send an ON/OFF signal thereto and the like. The ECU 60 incorporates, therein, a nonvolatile memory 161. The electric power steering apparatus 20 detects a steering state on the steering wheel 21 and assists the steering manipulation of the driver by controlling the motor 40 to generate an assist force depending on the steering state. Both ends of the rack shaft 24 are connected to vehicle wheels (not illustrated) via tie rods and the like, respectively.

Figure 2:
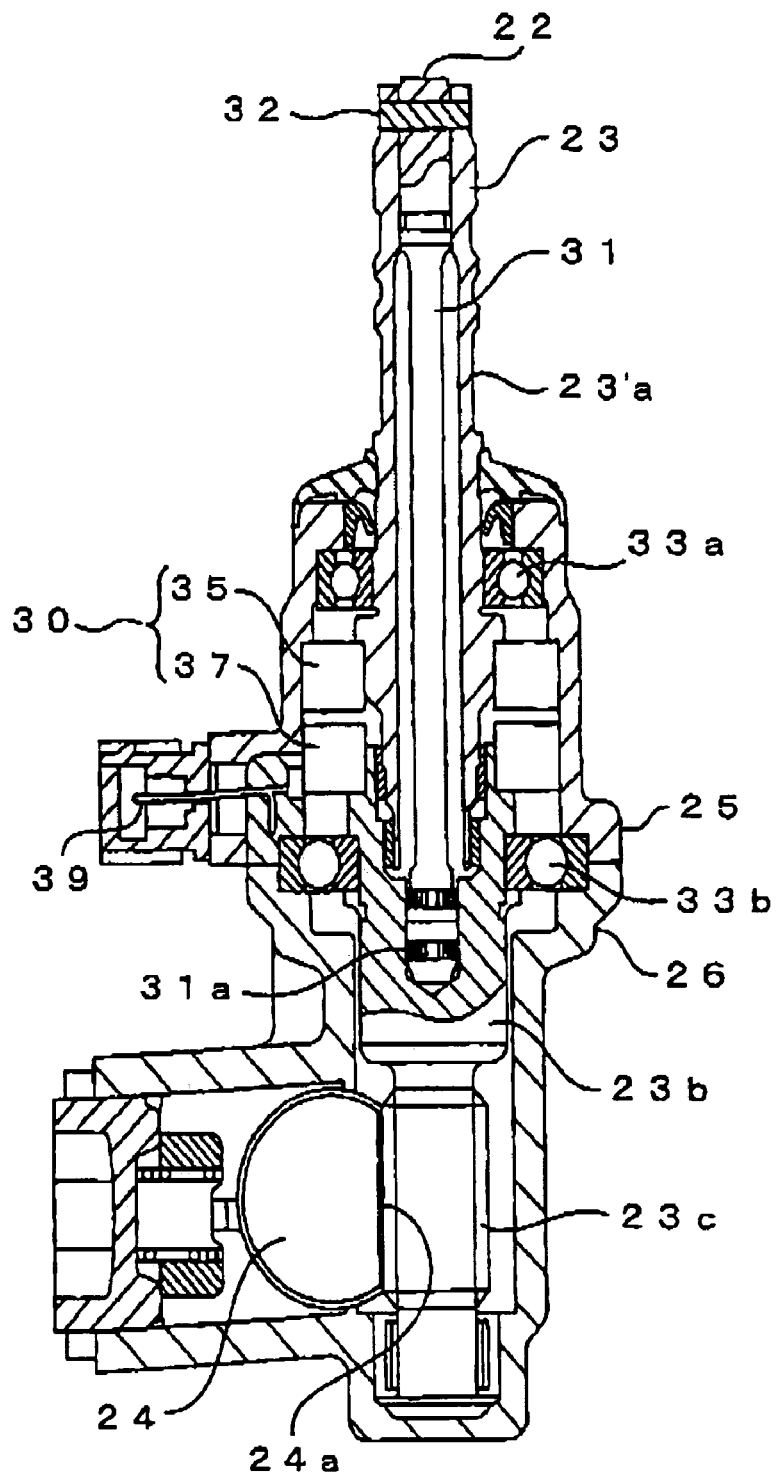
FIG. 2 is an enlarged view of the part encircled by a one-dot chain line A in FIG. 1.

More specifically, as illustrated in FIGS. 1 and 2, the steering wheel 21 is connected to one end of the steering shaft 22, whose other end is connected, by means of a pin 32, to an input shaft 23a of the torque sensor 30 and a torsion bar 31, which are both housed in a pinion housing 25. The other end 31a of the torsion bar 31 is spline-connected to an output shaft 23b of the pinion shaft 23.

The input shaft 23a, and the output shaft 23b, of the pinion shaft 23 are rotatably supported within the pinion housing 25 respectively by bearings 33a and 33b. A first resolver 35 (i.e., a steering angle sensor) is interposed between the input shaft 23a and the pinion housing 25, while a second resolver 47 (i.e., the steering angle sensor) is interposed between the output shaft 23b and the pinion housing 25. The first and second resolvers 35 and 37 are each capable of detecting the steering angle of the steering wheel 21 and are electrically connected to the ECU 60 through respective terminals 39, as typically illustrated in FIG. 5. The structures of these resolvers 35 and 37 will be described later in detail.

At an end portion of the output shaft 23b of the pinion shaft 23, there is formed a pinion gear 23c, to which a rack gear 24a of the rack shaft 24 is connected in meshing engagement. Thus, a rack-and-pinion mechanism is constructed in this manner.

With this construction, the steering shaft 22 and the pinion shaft 23 are connected by means of the torsion bar 31 to be rotatable relative to each other, and the rotational angle of the steering shaft 22, in other words, the rotational angle (mechanical angle) θTm of the steering wheel 21 can be detected based on a first steering angle (electrical angle) θT1 and a second steering angle (electrical angle) θT2 which are detected respectively by the first and second resolvers 35, 37. Further, a torsional quantity (corresponding to the steering torque) of the torsion bar 31 can be detected as a torsional angle based on the angular difference between the first steering angle θT1 and the second steering angle θT2, the angular ratio therebetween or the like.

Figure 3:
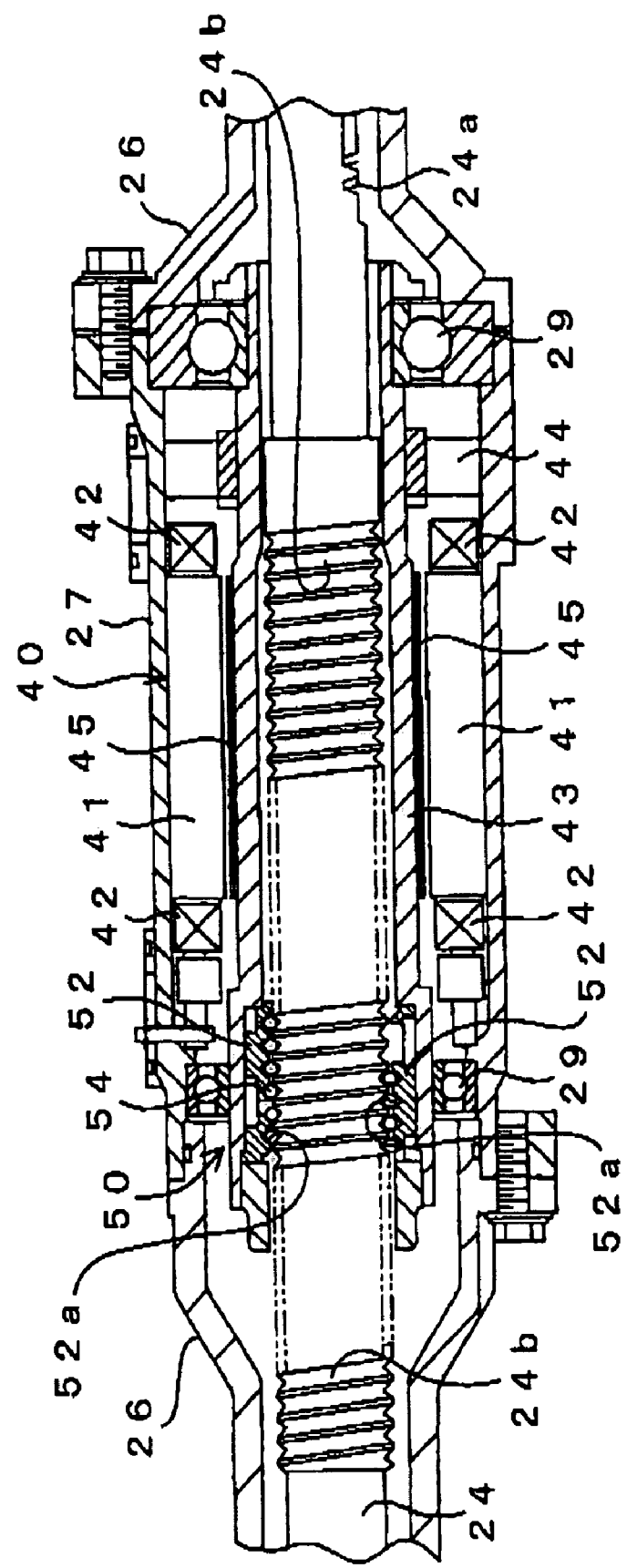
FIG. 3 is another enlarged view of the part encircled by a one-dot chain line B in FIG. 1.

As shown in FIGS. 1 and 3, the rack shaft 24 is housed within a rack housing 26 and a motor housing 27 and is formed with a male ball screw 24b at the intermediate portion thereof Around the ball screw 24b, a motor shaft 43 of a cylindrical shaped is supported by bearings 29 to be rotatable in coaxial alignment with the rack shaft 24. The motor shaft 43, together with a stator 41, exciting coils 42 and the like, configure the electric motor 40, wherein magnetic fields that are generated by the exciting coils 42 wound around the stator 41 acts on permanent magnets 45 arranged on the outer surface of the motor shaft 43 serving as a rotor, so that the motor shaft 43 can be rotated.

The motor shaft 43 has a ball nut 52 fit at its inner surface thereof. A female ball screw 52*a* is formed at the internal surface of the ball nut 52. A plurality of balls 54 can be rotatably interposed between the female ball screw 52*a* of the ball screw nut 52 and the male ball screw 24*b* of the rack shaft 24. This constitutes the ball screw mechanism 50 capable of moving the rack shaft 24 in the axial direction thereof in response to rotation of the motor shaft 43.

That is, the ball screw mechanism 50 configured with the both ball screws 24*b*, 52*a* and the like is able to convert the rotational torque in the positive-going and negative-going directions of the motor shaft 43 into the reciprocating motion of the rack shaft 24 in the axial direction thereof. Thus, the reciprocating motion of the rack shaft 24 becomes the assist force that reduces a degree of the steering force to be exerted on the steering wheel 21, through the pinion shaft 23 constituting the rack-and-pinion mechanism together with the rack shaft 24.

A motor resolver 44 capable of detecting a rotational angle (electrical angle) θMe of the motor shaft 43 is interposed between the motor shaft 43 of the motor 40 and the motor housing 27. This resolver 44 is electrically connected to the ECU 60 through terminals (not shown), as shown in FIG. 5.

The lock mechanism 130 is capable of restraining a rotation of the steering wheel 21 within a predetermined rotational range, at an event that the IGSW sensor 163 sends an off signal, which represents that an IGSW has been made off, to the ECU 60, or at an event that an ignition key is pulled out after the IGSW sensor 163 has sent an off signal to the ECU 60. The lock mechanism 130 is therefore mounted inter alia for an antitheft. Herein, a predetermined rotational range represents a range in which the steering wheel 21 can be rotated. Where a steering wheel is "N3-type", the predetermined rotational range is less than one rotation (greater than 0 degree and less than 360 degrees), while, where a steering wheel is "N2-type", the predetermined rotational range is less than half rotation (greater than 0 degree and less than 180 degrees). Since structures of the lock mechanism 130 are well-known, a detailed structure of the lock mechanism 130 is omitted herein.

Now, the structures of the first resolver 35, the second resolver 37 and the motor resolver 44 will be described with reference to FIG. 4A. Since these resolvers are substantially the same to one another in construction, the first resolver 35 is typically described with respect to those portions common to all the resolvers.

Figure 4A:
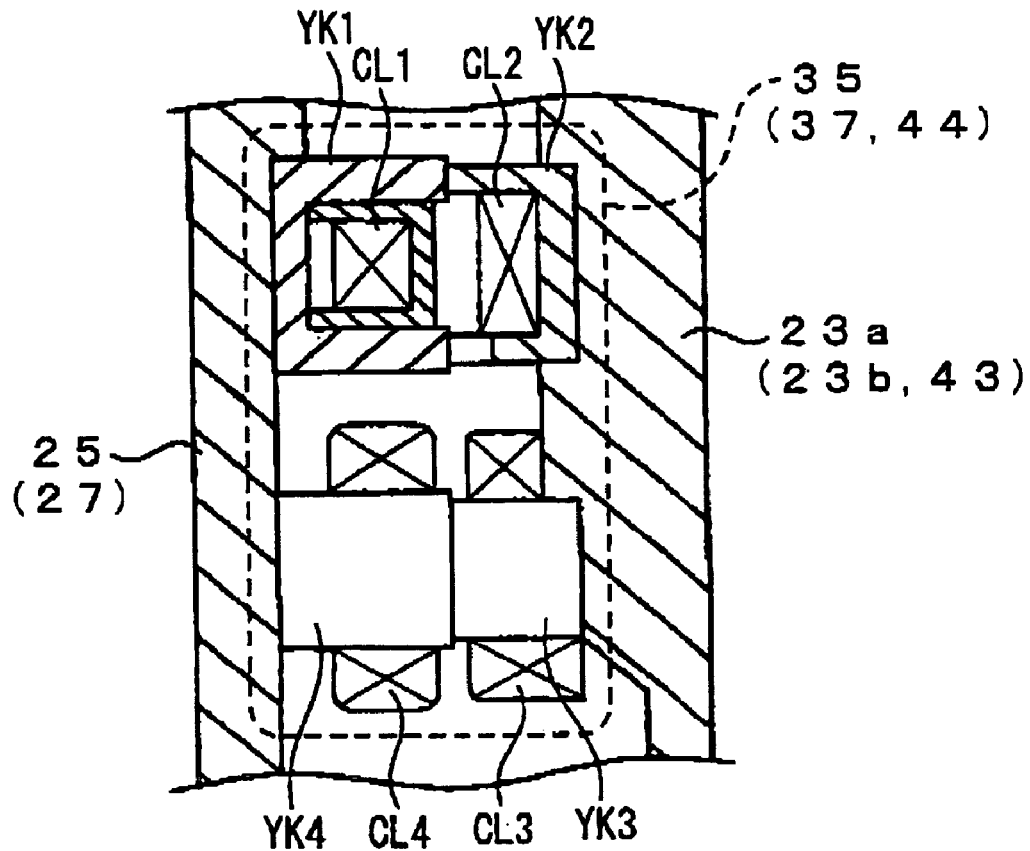
FIG. 4A is an explanatory view of resolvers used in the electric power steering apparatus according to the first embodiment of the present invention.
Figure 5:
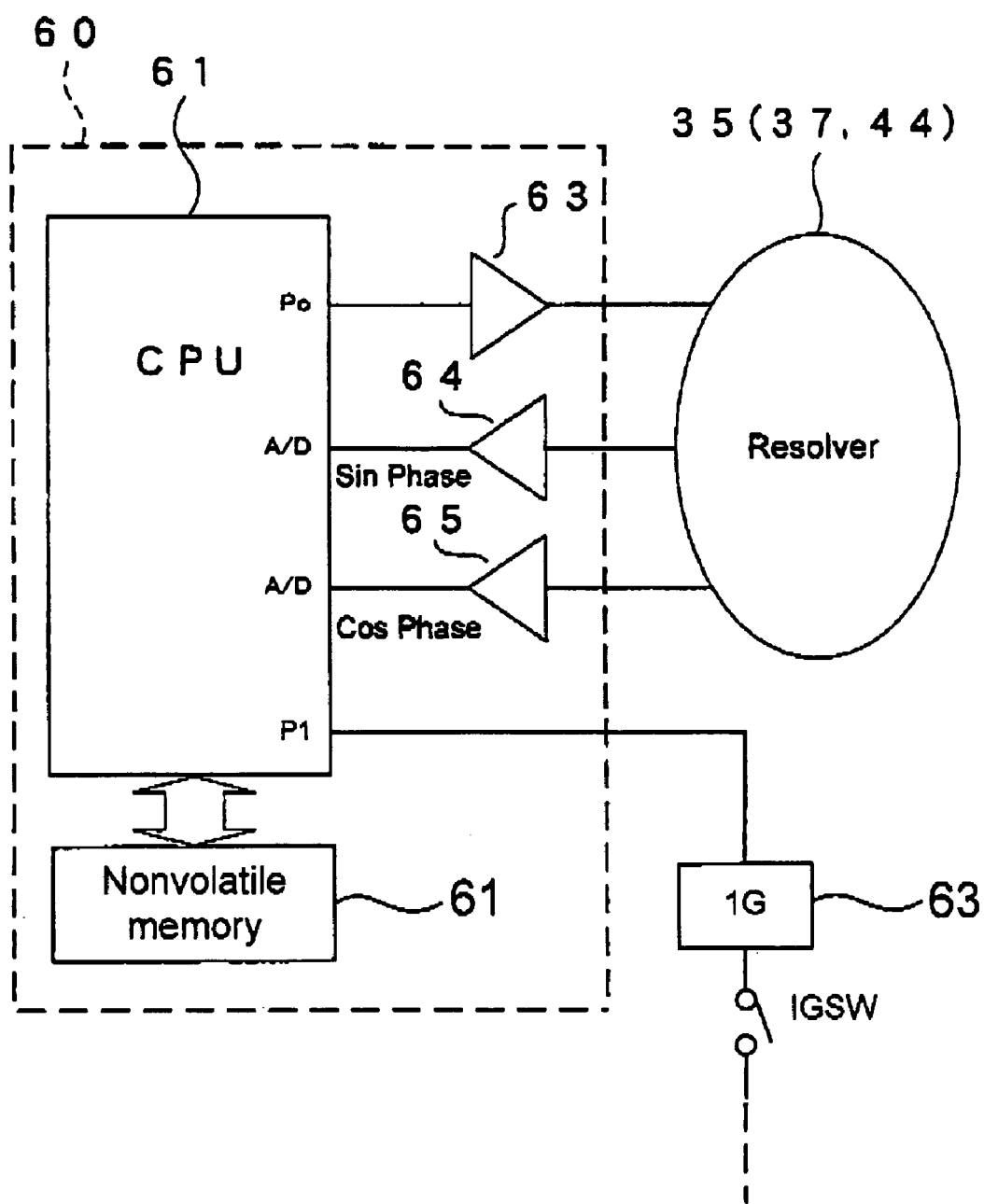
FIG. 5 is a block diagram showing the configuration in connection between an ECU controlling the electric power steering apparatus according to the first embodiment and each of the resolvers.

As shown in FIG. 4A, the first resolver 35 is configured with a first yoke YK1, a second yoke YK2, a third yoke YK3, a fourth yoke YK4, a first coil CL1, a second coil CL2, a third coil CL3 and a fourth coil CL4, and is of the type having five pole pairs (i.e., a so-called 5X). The term "the number of pole pairs" will be described later.

The first yoke YK1 is of an annular shaped structure along the inner surface of the pinion housing 25 and is secured thereto. The first coil CL1 is wound at the inner surface of the first yoke YK1. On the other hand, likewise as the first yoke YK1, the second yoke YK2 is also of an annular shaped structure and is secured to the circumferential surface of the input shaft 23*a* of the pinion shaft 23 so as to face the first yoke YK1. The second coil CL2 is wound at the second yoke YK2. Thus, the second yoke YK2 is rotatable bodily with the input shaft 23*a*.

Figure 4B:
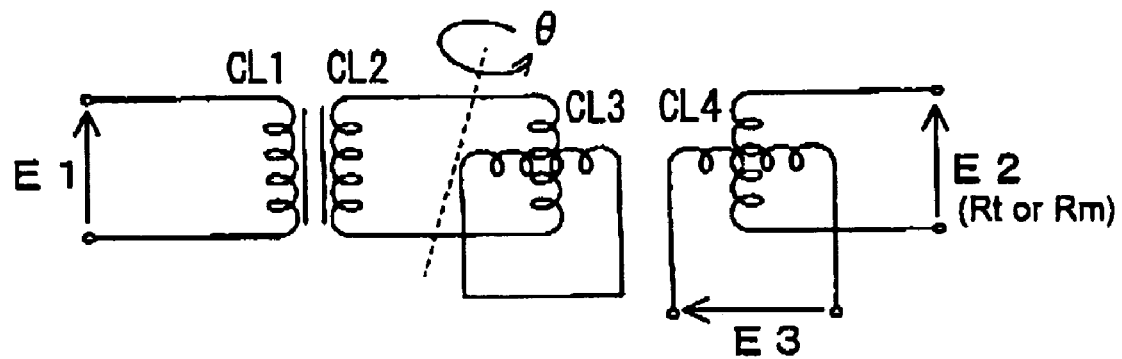
FIG. 4B is a circuit chart showing the circuit configuration of each of the resolvers.

The third yoke YK3 is secured to the circumferential surface of the input shaft 23*a* at a position shifted axially from the second yoke YK2 and thus, is rotatable integrally with the input shaft 23*a*. The third coil CL3 is wound at the third yoke YK3 and is electrically parallel-connected to the second coil CL2 of the second yoke YK2. On the contrary, likewise as the first yoke YK1, the fourth yoke YK4 is of an annular shaped structure along the internal surface of the pinion housing 25 and is secured thereto. Each of the third and fourth coils CL3 and CL4 is configured with two coils who are different from each other in phase by −90 or +90 degrees, as schematically illustrated in FIG. 4B.

The second resolver 37 is structured like the first resolver 35 except that the second yoke YK2, the third yoke YK3, the second coil CL2 and the third coil CL3 are provided at the output shaft 23*b* and that the number of the pole pairs is six (so-called "6X").

Further, the motor resolver 44 is structured also like the first resolver 35, but is different from the same in the following respects. In this motor resolver 44, the first yoke YK1, the fourth yoke YK4, the first coil CL1 and the fourth coil YK4 are provided at the inner surface of the motor housing 27, while the second yoke YK2, the third yoke YK3, the second coil CL2 and the third coil CL3 are provided at the motor shaft 43. Further, the number of the pole pairs in the motor resolver 44 is seven (so-called "7X").

Next, the electrical characteristics of the first resolver 35, the second resolver 37 and the motor resolver 44 will be described with reference to FIG. 4B. These resolvers are almost the same in electrical characteristics as one another, and therefore, the first resolver 35 will be typically described.

As mentioned earlier, the first resolver 35 is configured with the first to fourth coils CL1-CL4 and is of the type so-called "one exciting phase, two output phases" (voltage detection type) having a circuit of FIG. 4B. Therefore, an exciting signal E1 which is output from an output port P0 of a CPU 61 of the ECU 60 is applied to the first coil CL1 and the second coil CL2 serving as a transformer, through a buffer amplifier 63 of the ECU 60 and is further applied to the third coil CL3 serving as one exciting phase. As a result, resolver output signals E2 and E3 depending on a detection angle θ (electrical angle) can be obtained from the fourth coil CL4 including two output phase coils. Then, since the resolver output signals output from the first resolver 35 are analogue signals composed of a sine-phase signal and a cosine-phase signal, they are converted into digital signals which the CPU 61 can process, by being input into respective A-D (Analogue-to-Digital) converters incorporated in the CPU 61 through buffer amplifiers 64, 65 of the ECU 60.

Figure 6:
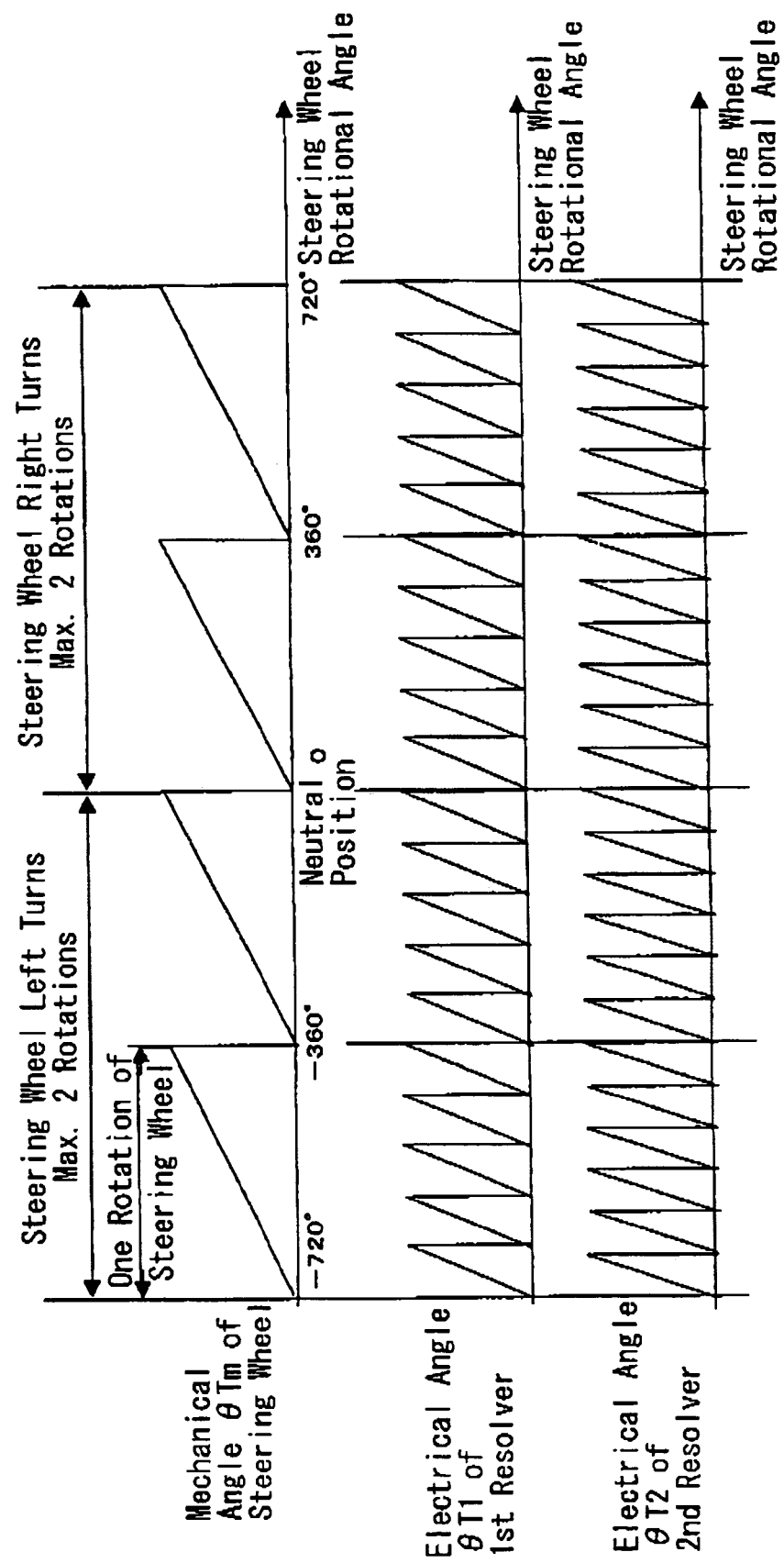
FIG. 6 is a characteristic chart showing resolver signals of first and second resolvers and the mechanical angle of a steering wheel in connection with the rotational angle of the steering wheel.

In this particular embodiment, the resolver output signal obtained from the first resolver 35 is converted by the CPU 61 into an electrical angle θT1 shown in FIG. 6, and in the same manner, the resolver output signal obtained from the second resolver 37 is converted by the CPU 61 into an electrical angle θT2.

Herein, it is noted that the electrical angle θT1 obtained from the first resolver 35 has five (5) peak points per rotation (360 degrees) of the steering wheel 21. This is because the first resolver 35 is of the type having five pole pairs each pair of which is composed of one N-pole and one S-pole in the electrical sense, and because it can output electrical angles corresponding to 1800 degrees (360 degrees.times.5) per 360 degrees in terms of a mechanical angle. In short, the first resolver 35 has a resolution of five times as much as a resolver which can output electrical angles of 360 degrees per 360 degrees in terms of a mechanical angle.

Further, it is noted that the electrical angle θT2 obtained from the second resolver 37 has six (6) peak points per rotation (360 degrees) of the steering wheel 21. This is because the second resolver 37 is of the type having six pole pairs each pair of which is composed of one N-pole and one S-pole in the electrical sense, and because it can output electrical angles corresponding to 2160 degrees (360 degrees.times.5) per 360 degree in terms of a mechanical angle. In short, the second resolver 37 has a resolution of six times as much as a resolver which can output electrical angles of 360 degrees per 360 degrees in terms of a mechanical angle.

As mentioned above, the first resolver 35 outputs the electrical angle θT1 as its resolver signal while the second resolver 37 outputs the electrical angle θT2 as its resolver signal, but as understood from FIG. 6, they do not take the same value even at any angle of the steering wheel 21. Consequently, over one rotation of the steering wheel 21, a high-resolution mechanical angle θTm can be obtained based on the electrical angle θT1 of the first resolver 35 and the electrical angle θT2 of the second resolver 37 through the computing process executed by the CPU 61 (i.e., an absolute rotational position specifying device and absolute rotational position specifying means).

Next, description will be made as to the torque detection which is based on the resolver signals output from the first and second resolvers 35, 37.

Where the input shaft 23a of the pinion shaft 23 rotates at a rotational angle θ1 in response to a manipulation of the steering wheel by a driver, as is illustrated in FIG. 4B, an alternate current E1 is applied to the first coil CL1, and magnetic fluxes are generated at the first yoke YK1 and the second yoke YK2.

Since at this time, an alternate current voltage depending on the change in the magnetic flux is induced in the second coil CL2, an alternate current voltage is also induced in the third coil CL3 connected to the second coil CL2. The alternate current voltage generated in the third coil CL3 causes an alternate current voltage to be induced in the fourth coil CL4, whereby alternate current voltages E2 and E3 are output. At this time, the alternate current voltages E2 and E3 which are different in phase from each other are output from the fourth coil CL4 which is composed of two kinds of coils, and these alternate current voltages E2, E3 respectively satisfy relations expressed by the following equations (1) and (2).

$$E2 = K \cdot E1 \times \cos \theta \quad (1)$$

$$E3 = K \cdot E1 \times \sin \theta \quad (2)$$

In the above equations (1) and (2), the symbol "K" represents the voltage transformation ratio.

Therefore, "θ" can be calculated from the above equations (1) and (2). This angle θ represents the rotational angle θ1 of the input shaft 23b of the pinion shaft 23. On the other hand, since the output shaft 23b of the pinion shaft 23 which is connected to the input shaft 23a through the torsion bar 31 is rotated upon rotation of the input shaft 23a, the second resolver 37 provided at the side of the output shaft 23b outputs corresponding signals E2 and E3, based on which the rotational angle θ2 can also be calculated using the above equations (1) and (2).

When the input shaft 23a, and the output shaf 23b, of the pinion shaft 23 are rotated, a relative rotational angle difference Δθ (=θ1−θ2) between the input shaft 23a and the output shaft 23b is generated due to torsion of the torsion bar 31. As a result, the steering torque T can be calculated from the relative rotational difference Δθ indicating the torsion angle of the torsion bar 31 and the torsional rigidity of the torsion bar 31. Accordingly, by executing a known assist control for assisting the steering force in dependence on the calculated steering torque T, the CPU 61 of the ECU 60 is able to control the aforementioned motor 40, so that the steering manipulation of the driver can be assisted with the steering force generated by the motor 40.

Further, detecting the rotational angle of the motor shaft 43 (hereafter as "motor rotational angle") based on a resolver signal output from the motor resolver 44 can also be explained as follows.

When the motor shaft 43 is rotated at a certain rotational angle, an alternate current voltage E1 is applied to the first coil CL1 of the motor resolver 44. A magnetic flux is then generated at the first yoke YK1 in response to the applied voltage E1, and the generated magnetic flux is conveyed to the second yoke YK2. Since this magnetic flux flows across the second coil CL2, an alternate current voltage is induced to the second coil CL2. An alternate current voltage is hence generated also in the third coil CL3 connected to the second coil CL2. The alternate current voltage generated at the third coil CL3 causes an alternate current to be induced in the fourth coil CL4, whereby alternate current voltages E2 and E3 are output. Thus, the motor rotational angle can be calculated on the basis of the applied alternate voltage E1 and the output alternate currents E2, E3 in accordance with the aforementioned equations (1) and (2). The motor rotational angle detected in this way can be utilized for various controls in the electric power steering device 20.

Subsequently, the processing for detecting the absolute position of the steering wheel 21 in the electric power steering device 20 as constructed above will be described with reference to FIGS. 6 through FIG. 10.

As is illustrated in FIG. 5, the CPU 61 which configures the ECU 60 is electrically connected to each of the first and second resolvers 35, 37 and the motor resolver 44 through the buffer amplifiers 63, 64 and 65. Although not illustrated in FIG. 5, the CPU 61 is connected to a semiconductor memory device as a main memory device and to various types of interface devices. At an input port PI of the ECU 60, the IGSW sensor 163 is connected, which is capable of detecting an on/off state of the IGSW. Moreover, the first and second resolvers 35 and 37 are able to detect the steering angle (electrical angles θT1, θT2) of the steering wheel 21, while the motor resolver 44 is able to detect the motor rotational angle (electrical angle θMe) of the motor 40. Therefore, it is possible for the CPU 61 for memorizing, as an IG-off steering angle θAm-off (an IG-off absolute rotational position), an absolute steering angle θAm (absolute rotational position) of the steering wheel 21, the absolute steering angel θAm which is obtained on the basis of the first resolver 35, the second resolver 37 and the motor resolver 44 immediately before making the IGSW off. Thus, in this particular embodiment, an absolute steering angle θAm of the steering wheel 21 can be obtained through an absolute position detecting processing explained in FIG. 10. It is to be noted that the absolute position detecting processing is executed immediately after an ignition switch is made ON, and in the subsequence to this, a parameter A (A=1, 0, −1, −2) which indicates the range, in which the rotation of the steering wheel 21 obtained through the absolute position detecting processing, is updated at regular time interval (e.g., each five milliseconds) in response to a timer-based interruption or the like As is summarized in FIG. 9, the CPU 61 of the ECU 160 executes the following processes through an IG-off steering angle memorizing processing.

In the first place, at Step S101, the CPU 61 judges, on the basis of an IGSW signal sent from the IGSW sensor 163, whether the IGSW has shifted to an off state from an on state. When the IGSW has shifted to an off state (i.e., an affirmative answer "Yes" at Step S101), the program proceeds to Step S103, wherein a current absolute steering angle θAm is memoried as an IG-off steering angle θAm-off at the nonvolatile memory 161 (e.g., an EEPROM, a battery-backup SRAM or DRAM). Even when a current one rotational range A (=2, −1, 0, 1) is memorized at the nonvolatile memory 161 in stead of a current absolute steering angle θAm, it is possible to proceed, through the later described absolute position detecting processing (part 1 and part 2), in the same manner as the IG-off steering angle θAm-off.

As described above, an absolute steering angle θAm, which was obtained immediately before making the IGSW off, is memorized, at the nonvolatile memory 161, as an IG-off steering angle θAm-off, when the IGSW is made on, it is possible to read out this IG-off steering angle θAm-off. The nonvolatile memory 161 at Step S103 corresponds to a memorizing means.

Next, described below is a flow of the "absolute position detecting processing (Part 1)" with reference to FIGS. 9, 10, 11 and 16A. This absolute position detecting processing part 1) is applicable to a case in which a numerical value of the decimal place of the calculated value (r) is set to 0.33 (N3-type).

Figure 10:
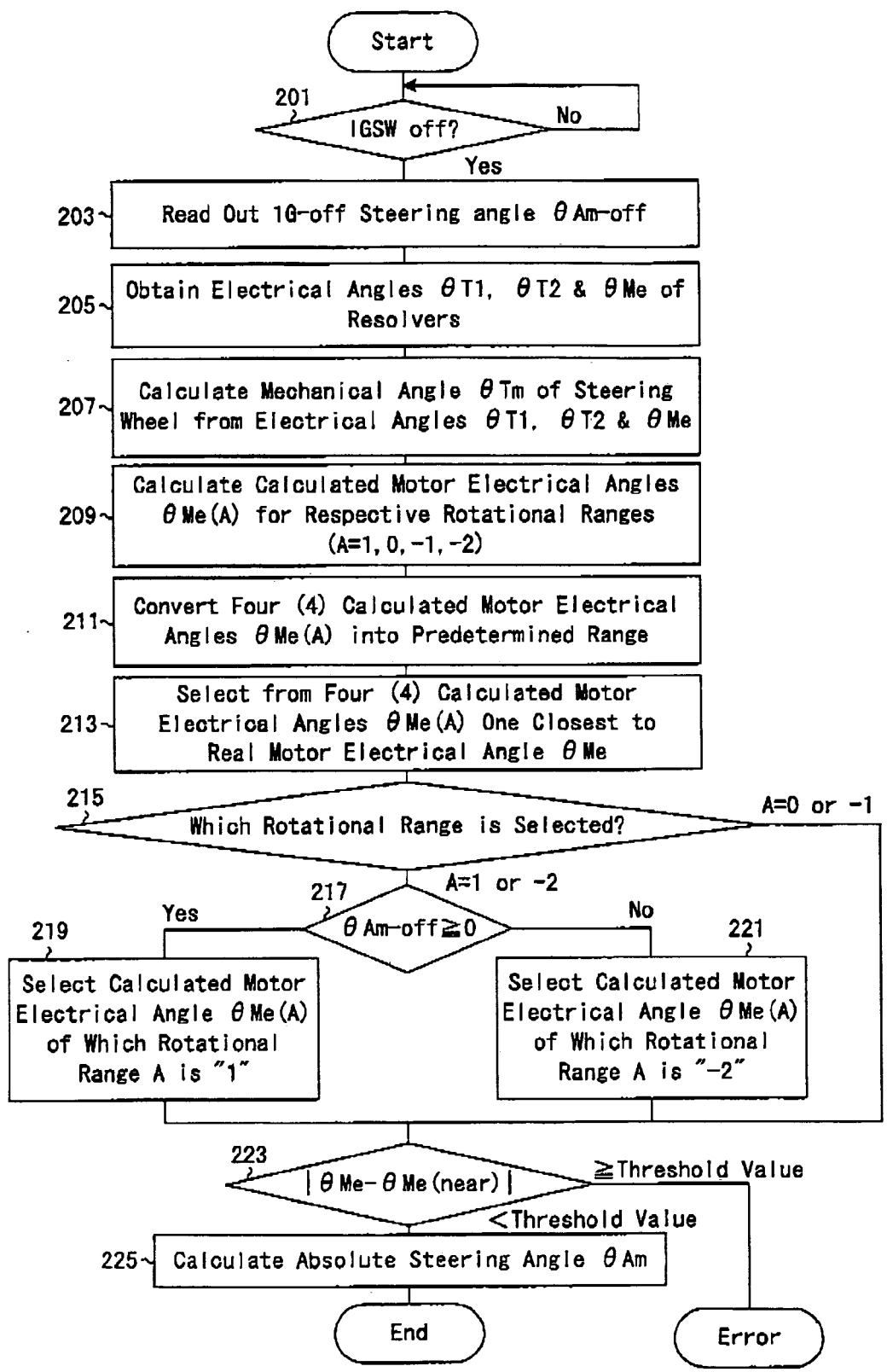
FIG. 10 is a flowchart showing the flow of absolute position detecting processing executed by the CPU shown in FIG. 5.

As is summarized in FIG. 10, at step S201, the CPU 61 judges, on the basis of the IGSW signal outputted from the IGSW sensor 163, whether the IGSW has shifted from an off state to an on state. When the IGSW is judged to have shifted to an on state (an affirmative answer "Yes" at step S201), the program proceeds to step S203, wherein the CPU 61 reads out an IG-off steering angle θAm-off memorized at the nonvolatile memory 161. This IG-off steering angle θAm-off corresponds to an absolute steering angle θAm of the steering wheel 21 obtained immediately before making the IGSW off. Moreover, at a time that the IGSW is made off, the range, in which the steering wheel 21 can rotate, is restrained to be less than one rotation by the lock mechanism 130. Therefore, it is possible to specify, on the basis of the range, in which the steering wheel 21 can rotate, and the IG-off steering angle θAm-off as described later, a range of an absolute steering angle θAm of the steering wheel 21 immediately after making the IGSW on.

At step S205, processing for acquiring the electrical angles θT1, θT2, θMe of the resolvers 35, 37, 44 is executed. More specifically, since the electrical angles θT1, θT2 which correspond to the steering angle of the steering wheel 21 are output from the first and second resolvers 35, 37, the resolver signals output from the first and second resolvers 35, 37 are acquired through the buffer amplifies 64, 65 and the A-D converters. Simultaneously, the electrical angle θMe which corresponds to the motor rotational angle of the motor 40 is detected from the motor resolver 44, and the resolver signal output from the motor resolver 44 is acquired through the buffer amplifies 64, 65 and the A-D converters.

At the next Step S207, processing is executed to calculate a mechanical angle θTm of the steering wheel 21 from the electrical angles θT1, θT2. In this particular embodiment, since the first and second resolvers 35, 37 are constructed to be of the five-pair poles and the six-pair poles respectively, the mechanical angle θTm of the steering wheel 21 can be calculated based on the electrical angles θT1, θT2 of the two resolvers 35, 37 differing in the number of pole pairs from each other. This operation processing is described in detail in unexamined European Patent Publication No. 01 550 839 filed by the Assignee of the present application, and hence, reference is to be made to that application for details.

At the next step S209, processing is executed to calculate the electrical angle θMe(A) corresponding to each rotational amount (A=1, 0, −1, −2). For example, with respect to the neutral position of the steering wheel 21 as the steering center, one rotational range (0<θ≦360 degrees) to the right is set as A=0, and another successive rotational range (360<θ≦720 degrees) to the right is set as A=1, while with respect to the neutral position as the steering center, one rotational range (0>θ≦−360 degrees) to the left is set as A=−1 and another successive rotational range (−360<θ≦−720 degrees) to the left is set as A=−2. In the case of the rotational ranges being so set, four calculated motor electrical angles θMe(1), θMe(0), θMe(−1), θMe(−2) which respectively correspond to A=1, 0, −1, −2 are calculated using the following equation (3). That is, at this Step S209, processing is executed to calculate the calculated motor electrical angle θMe(A) for each of the total rotations (in this particular embodiment, for four rotations of the steering wheel 21) of the steering wheel 21.

$$\theta Me(A)=(\theta Tm+360\times A)\times r \quad (3)$$

In this equation, symbol "r" denotes a calculation valve, which is the product of a speed reduction gear ratio of the ball screw mechanism 50 (i.e., a speed reduction gear mechanism) with the number of pole pairs of the motor resolver 44, it is the essential requirement that the product is to be a non-integer with a numerical value of the decimal place. In this particular embodiment, since the reduction gear ratio of the ball screw mechanism 50 has been set to 8.19 for example, and the number of pole pairs of the motor resolver 44 has been set to 7 for example, the calculated value becomes 57.33 (=8.19 times 7), and the numerical value of the decimal place is 0.33.

Further, at Step S211, processing is executed to convert the four calculated motor electrical angles θMe(A) into predetermined angular ranges. That is, in order that each of the calculated motor electrical angles θMe(A) calculated at Step S209 becomes within an angular range of 0 to 360 degrees, the electrical angles less than 0 degrees are processed to be taken as the absolute values, and the electrical angles larger than 360 degrees are processed under the calculation of "θMe(A)−INT(θMe(A)/360).times.360". The symbol "INT( )" in this calculation stands for a function for converting the quotient within the parenthesis into an integer. For example, the conversion processing is executed in such a way that where the calculated motor electrical angle θMe(−2) is −80 degrees, it is converted into +80 degrees (=|80 degrees|), where the calculated motor electrical angle θMe(1) is 380 degrees, it is converted into 20 degrees (=380−1.times.360 degrees) and where the calculated motor electrical angle θMe(2) is −400 degrees, it is converted into 40 degrees (=|−400−(−360)|).

At successive Step S213, processing is executed to select from among the four calculated motor electrical angles θMe(A), one which is closest in value to an actual motor electrical angle θMe (hereafter referred to as "real motor electrical angle θMe" to be distinguished from the calculated motor electrical angles θMe(A)). That is, as mentioned later, of the four calculated motor electrical angles θMe(A) which have been obtained for the total rotations of the steering wheel 21 at Steps S209 and S213, one of them is the calculated motor electrical angle θMe(near) that properly represents the absolute position of the steering wheel 21, and therefore, the processing for selecting such one calculated motor electrical angle θMe(A) is executed at this step S213.

The processing at this Step 213 may be modified to the processing for selecting one closest to an integer, from all the calculated motor electrical angles θMe(A) calculated through Steps S209 to S213. In this particular embodiment, however, the processing for selecting one closest to the real motor electrical angle θMe detected by the motor resolver 44 is executed at this Step S213. This can be done by calculating the differences between the real motor electrical angle θMe acquired at Step S205 and all the calculated motor electrical angles θMe(A) and then, by selecting as the calculated motor electrical angle θMe(near) one corresponding to the smallest difference. That is, in order to obtain a current absolute steering angle θAm of the steering wheel 21, a calculated motor electrical angle θMe, which is most appropriate, can be selected.

At Step S215, processing is executed to determine to which rotational amount, from among four-kind rotational amounts (A=-2, -1, 0, 1), the calculated motor electrical angle θMe(A) selected at Step S213 corresponds. That is, as is shown in FIG. 7A, according to the electric power steering apparatus of "N-3 type", by which a steering angle of the steering wheel 21 can be detected within these rotational ranges (A=-2, -1, 0 or A=-1, 0, 1), at an event that a rotational range of the steering wheel 21 falls at a rotational range A=1 or A=-2, it is not possible to distinguish an absolute steering angle θAm (values αd and δd) of the steering wheel 21 at both rotational ranges. In the light of the foregoing, at Step S215, processing is executed to distinguish a case (A=0 or -1), where an absolute steering angle θAm of the steering wheel 21 can be distinguished on the basis of a value of a rotational range A, and the other case (A=1 or -2), where an absolute steering angle θAm of the steering wheel 21 can not be distinguished on the basis of a value of a rotational range A.

When the CPU 61 judges that an absolute steering angle θAm of the steering wheel 21 can be distinguished on the basis of a value of a rotational range A of the steering wheel 21, in other words A=0 or -1 at Step S215, the program proceeds to step S223. On the other hand, when the CPU 61 judges that an absolute steering angle θAm of the steering wheel 21 can not be distinguished on the basis of a value of a rotational range A of the steering wheel 21, in other words A=1 or -2 at Step S215, the program proceeds to step S217.

When an actual (current) rotational range of the steering wheel 21 is A=1 or -2, i.e., when the steering wheel 21 is positioned, from the neutral steering position, within a range beyond one rotation to the right, in other words within a rotational range A=1, or within a range beyond one rotation to the left, in other words within a rotational range A=-2, processing at Step S317 is executed. At Step S317, processing is executed to determine if a steering angle θAm-off has been controlled to 0 degree or more.

As described above, a rotation range, in which the steering wheel 21 can rotate at a time that the IGSW has been made OFF, is restrained, by the lock mechanism 130 (i.e., a rotational range restraining device and a rotational range restraining means), to less than one rotation (360 degrees). Therefore, when the latest steering angle θAm-off is 0 degree or more, i.e., when an affirmative answer Yes is obtained at Step S217, the steering wheel 21 is positioned at least at a right side from the neutral steering position. On the other hand, when the latest steering angle θAm-off is not 0 degree or more, i.e., when a negative answer No is obtained at Step S217, the steering wheel 21 is positioned at least at the left side from the neutral steering position.

That is, as is illustrated in FIG. 7A, at a time that the steering angle θAm-off is 0 degree or more, a rotational range θN3LK of the steering wheel 21 has been restrained to a range "-360 degrees<θN3LK≦0 degree". Therefore, even if the steering wheel 21 is assumed to have been positioned at the neutral steering position (absolute steering angle θAm=0 degree) that represents the most left-side position at a state where the IGSW has been made off, the steering wheel 21 can be prevented from rotating, from the neural steering position, towards the left side position which falls within a rotational range (A=-2) that exceeds 360 degrees. Therefore, when the steering angle θAm-off is 0 degree or more, the actual rotational range of the steering wheel 21 can be determined to have been at A=1.

On the other hand, at a time that the steering angle θAm-off is not 0 degree or more, a rotational range θN3LK of the steering wheel has been restrained to a range "0 degree≦θN3LK<360 degrees". Therefore, even if the steering wheel 21 is assumed to have been positioned at the neutral steering position (absolute steering angle θAm=0 degree) that represents the most right-side position in a state where IGSW has been made off, the steering wheel 21 can be prevented from rotating, from the neutral steering position, towards the right side position which falls within a rotational range (A=1) that exceeds 360 degrees. Therefore, when the steering angle θAm-off is less than 0 degree, the actual rotational range of the steering wheel 21 can be determined to have been at A=-2.

As described above, with reference to the flowchart illustrated in FIG. 10, at Step S217, when the steering angle θAm-off is determined to have been 0 degree or more, i.e., when an affirmative answer Yes is obtained at Step S217, the program proceeds to Step S319, thereby selecting the calculated motor electrical angle θMe(A) falling at a rotational range A=1. On the other hand, at Step S217, when the steering angle θAm-off is determined to have been less than 0 degree, i.e., when a negative answer No is obtained at Step S217, the program proceeds to Step S221, thereby selecting the calculated motor electrical angle θMe(A) falling at a rotational range A=-2.

In the following Step S223, processing is executed in order to judge whether or not, the calculated motor electrical angle θMe(A) selected at either Step S219 or S221 is really appropriate. At Step S225, the parameter A indicative of the calculated motor electrical angle θMe selected at Step S213 (the index A in this particular embodiment is any of 0, 1, -1 and -2) is substituted into the following equation (4) to execute processing based on the mechanical angle θTm of the steering wheel 21 which has been calculated at Step S207. As a consequence, an absolute steering angle θAm of the steering wheel 21 can be detected, so that a series of the absolute position detecting processing (Part 1) is terminated normally.

$$\theta Am = \theta Tm + 360 \times A \quad (4)$$

Figure 11:
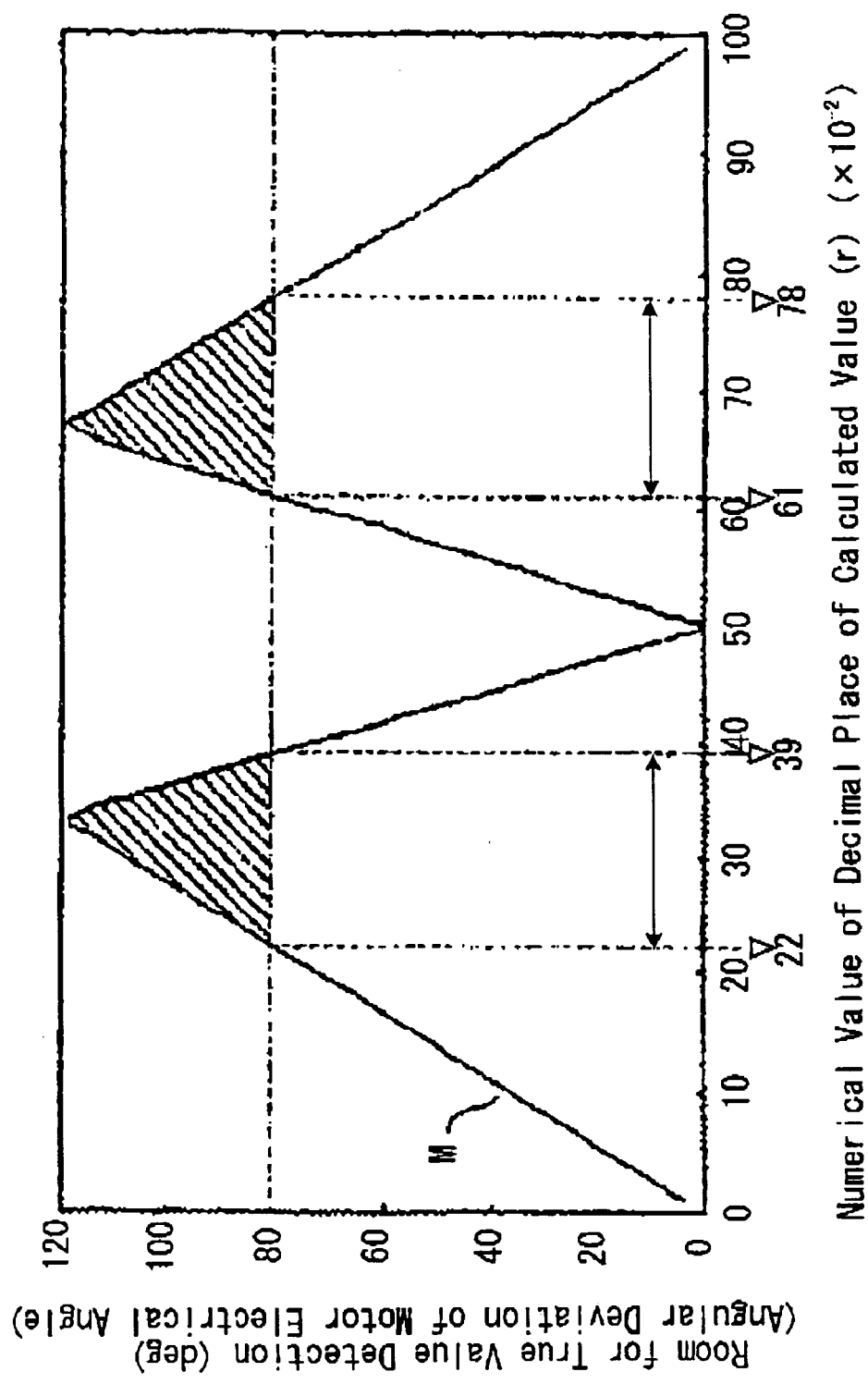
FIG. 11 is a characteristic graph (zigzag line M) showing the variation of a room for true-value detection in connection with a numerical value of the decimal place of the calculated value (r)
Figure 12:
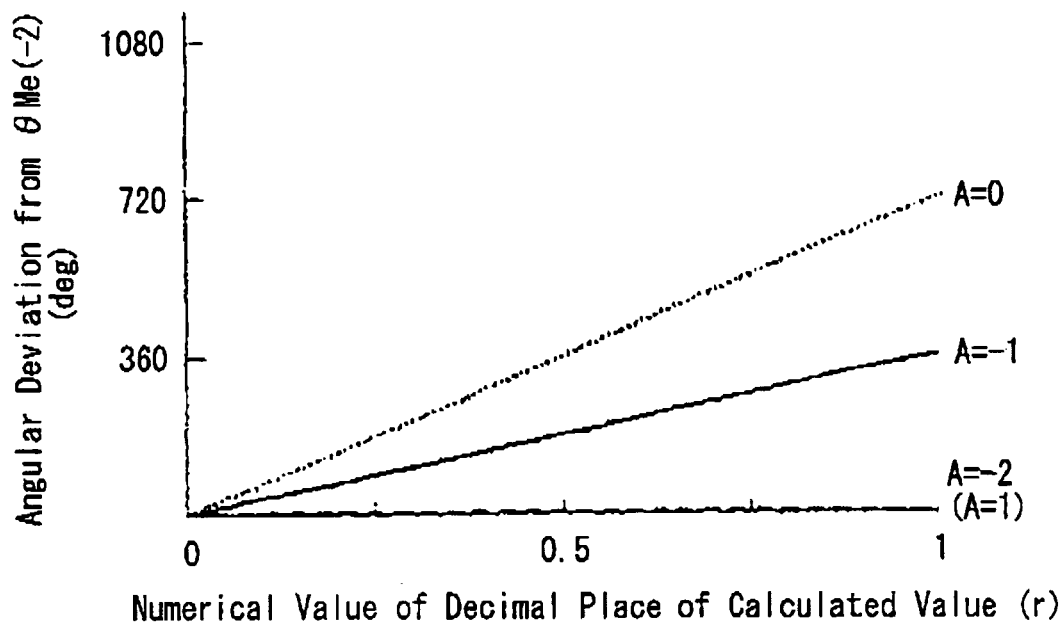
FIG. 12A is a characteristic graph showing the deviations from calculated motor electrical angles $\theta Me$ (−2) in connection with the variation in a numerical value of the decimal place of the calculated value (r)
FIG. 12B is a similar characteristic graph (zigzag line M) wherein the deviations shown in FIG. 12A are represented as being turned back each time of reaching the deviation of 180-degrees.
Figure 12:
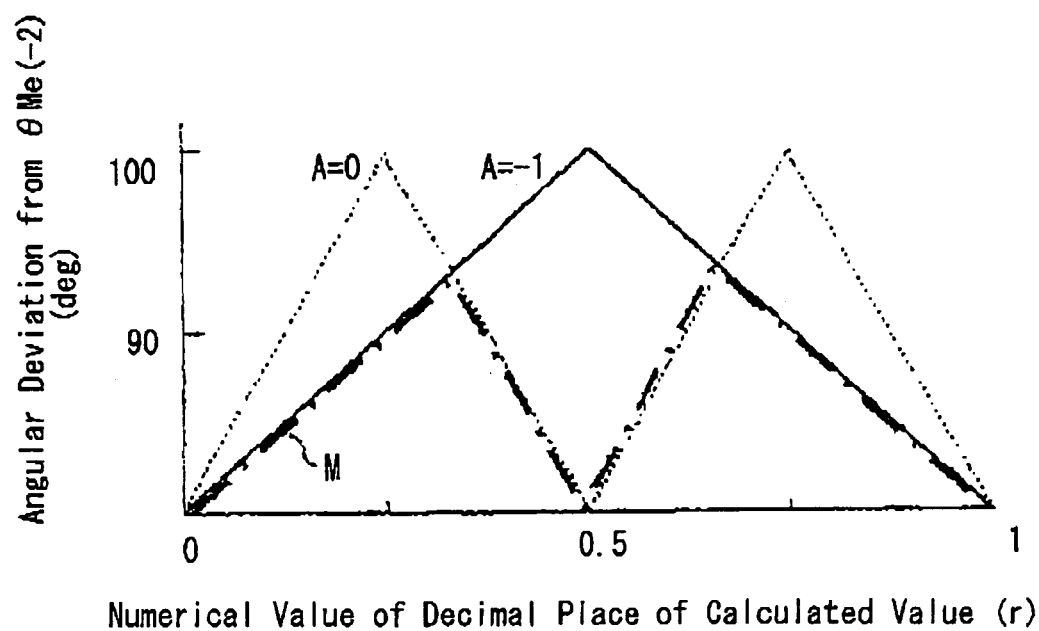

Next, the grounds for the characteristic chart (zigzag line M) in FIG. 11 representing the variation in the room for the true value detection in relation to the numerical values of the decimal place of the calculated value (r) will be described with reference to FIGS. 12A and 12B. FIG. 12A shows the characteristic representing the variation of the deviations from the calculated motor electrical angle θMe(-2) in relation to the numerical values of the decimal place of the calculated value (r).

As having been described with reference to FIG. 7A, where the numerical value of the decimal place of the calculated value (r) is set to 0.33, values αd and δd, which both have the same value, appear at two portions (A=-2 and 1) for any of the four-kind rotational amounts (A=-2, -1, 0, 1) of the steering wheel 21, and therefore, it is unable to distinguish the true value from the false values. That is, in FIG. 7A, where the numerical value of the decimal place of the calculated value (r) is set to 0.33, the same value is taken at A=−2 and 1, wherein it is not possible to distinguish from each other.

Meanwhile, where the deviations of the calculated motor electrical angle θMe(A) from the base of the broken line for A=−2 are calculated in the respective cases of A=−1, A=0 and A=1 as the numerical value of the decimal place of the calculated value (r) is varied from 0 to 1, it would be understood that a relationship shown in FIG. 12A exists among them. And, where the respective deviations so calculated are represented as being turned back each time of reaching 180 degrees, there can be obtained a characteristic chart of a chevron shape as shown in FIG. 12B. The broken lines for A=−2 and 1 are omitted in FIG. 12B.

More specifically, while the solid line for A=−1 increases linearly from 0 to 360 degrees in FIG. 12A, it turns back each time of reaching 180 degrees in FIG. 12B. Thus, the solid line for A=−1 in FIG. 12B turns back each time the numerical value of the decimal place of the calculated value (r) reaches 0.5, thereby to decrease linearly with a negative inclination and thus, forms a zigzag line (solid line) drawing an isosceles triangle.

And, while the dotted line for A=0 increases linearly from 0 to 720 degrees in FIG. 12A, it turns back each time of reaching 180 degrees and 0 degree in FIG. 12B. Thus, the dotted line for A=0 in FIG. 12B turns back each time the numerical value of the decimal place of the calculated value (r) reaches 0.25, 0.5 and 0.75, thereby repeating increase and decrease twice and thus, forming a zigzag line (dotted line) drawing two isosceles triangles.

Further, where the calculated motor electrical angle θMe (−2) in the case of A=−2 is assumed as the true value, each of the zigzag lines represented above shows that as the deviation from the broken line for A=−2 comes close to 0 (zero), the confusion tends to arise between the calculated motor electrical angle θMe(−2) as the true value and the calculated motor electrical angles θMe(−1), θMe(0) and θMe(1) respectively as other false values. Therefore, where the false values each of which is closest to the electrical angle θMe(−2) as the true value at each of the numerical values of the decimal place are selected from the zigzag lines, the zigzag line M (represented by the thick line in FIG. 12B can be generated. That is, this zigzag line M is the characteristic (zigzag line M), as described with reference to FIG. 11, which represents the variation in the room for the true value detection in relation to the numerical values of the decimal place of the calculated value (r).

According to the electrical power steering apparatus 20 by which an absolute steering angle θAm can be detected through the above-described absolute position detecting processing (part 1), an absolute steering angle θAm of the steering wheel 21, which was obtained immediately before making off the IGSW, is memorized at the nonvolatile memory 161 (i.e., a memory) as a steering angle θAm-off. After making on the IGSW, on the basis of the latest steering angle θAm-off memorized in the nonvolatile memory 161 and a rotational range of the steering wheel 21 which is restrained to less than 360 degrees by the lock mechanism 130, an absolute steering angle θAm of the steering wheel 21, which is obtained from the electrical angle θT1, the electrical angle θT2, and the actual motor electrical angle θMe, can be specified, at Steps S201, S203, S217, S219 and S221 of the absolute position detecting processing (part 1) from among plural rotational ranges A=−2 or 1.

Accordingly, according to the first embodiment of the present invention, even where an absolute steering angle θAm of the steering wheel 21 is specified from among plural rotational ranges A=−2 or 1, it is possible to precisely detect an absolute steering angle θAm, thereby enabling to control the motor 40 to assist a steering manipulation on the basis of the absolute steering angle θAm of the steering wheel 21.

Figure 16A:
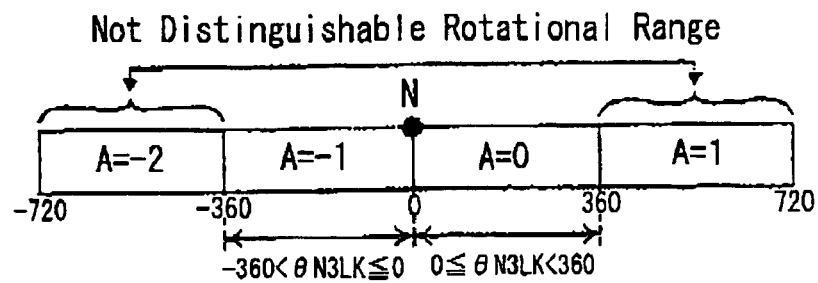
FIGS. 16A, 16B and 16C are explanatory views for explaining a positional relationship between rotational ranges which are not distinguishable therebetween.
Figure 16B:
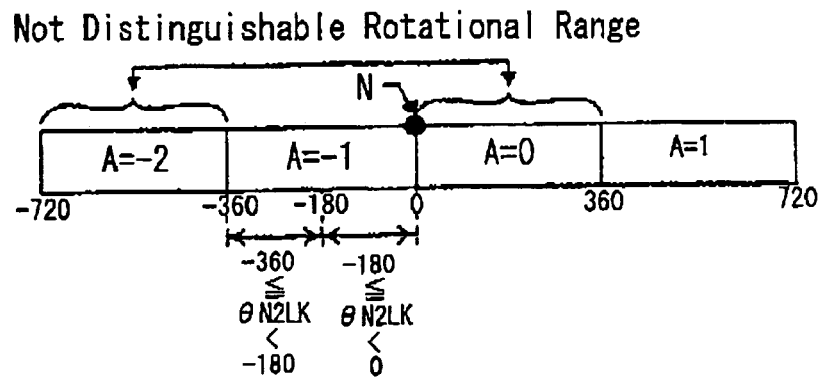
Figure 16C:
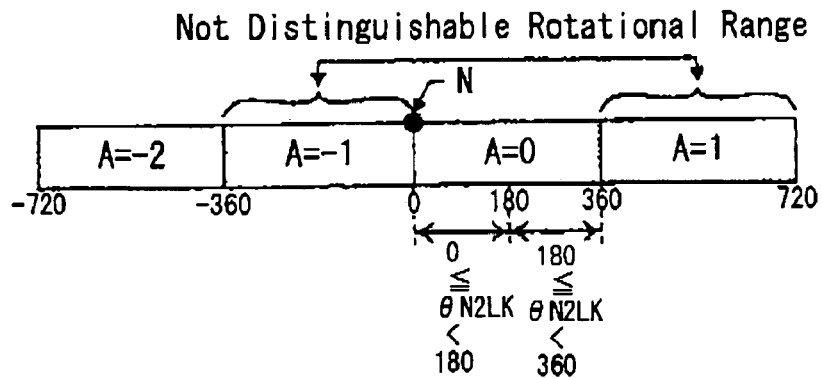

Next, described below is a flow of the "absolute position detecting processing (Part 2)" with reference to FIGS. 13 and 16. This absolute position detecting processing (part 2) is applicable to a case in which a numerical value of the decimal place of the calculated value (r) is set to 0.50 (N2-type).

Figure 13:
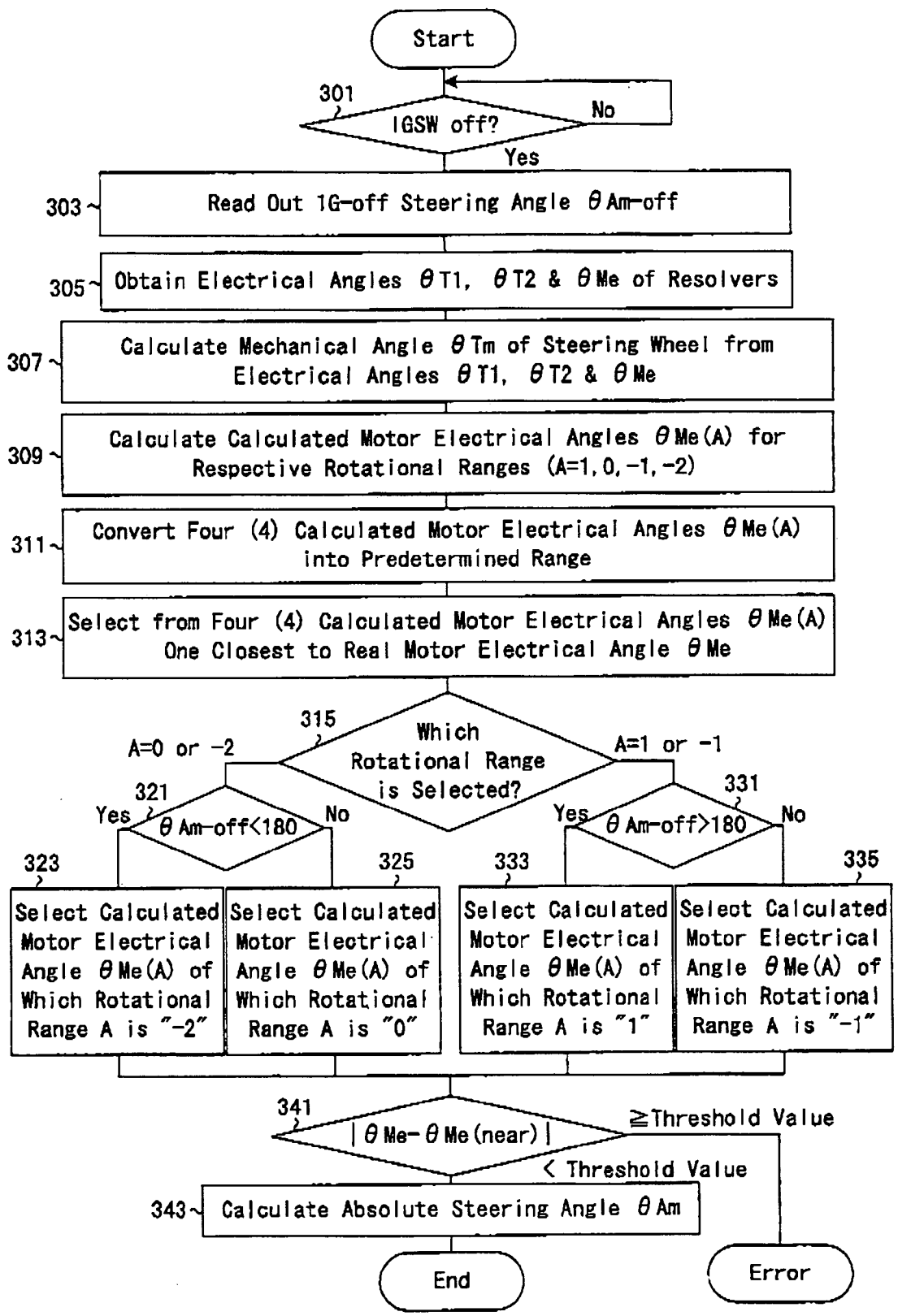
FIG. 13 is another flowchart showing the flow of the absolute position detecting processing executed by the CPU shown in FIG. 5.

At steps 301 through 313 in FIG. 13, the same processing at Steps 201 through 213 in FIG. 10 is manipulated. Therefore, explanation thereof will be omitted herein.

As is summarized in FIG. 13, at an absolute position detecting processing (part 2), after executing each processing at steps S301 through 313, at the successive steps S315, processing is executed to determine to which rotational amount, from among four-kind rotational amounts (=−2, −1, 0, 1), the calculated motor electrical angle θMe(A) selected at Step S323 corresponds. That is, as is shown in FIG. 7A, according to the electric power steering apparatus of "N-3 type", by which a steering angle of the steering wheel 21 can be detected within these rotational ranges (A=−2, −1, 0 or A=−1, 0, 1), at an event that a rotational range of the steering wheel 21 falls at a rotational range A=0 or A=−2, or at a rotational range A=1 or A=−1, it is not possible to distinguish an absolute steering angle θAm (values αd and δd) of the steering wheel 21 at both rotational ranges. In the light of the foregoing, processing is executed to distinguish to which rotational range (A=0 or −2, or A=1 or −1) an absolute steering angle θAm of the steering wheel 21 corresponds. When a value of a rotational range A corresponds to A=−2, (A=0 or −2 at Step S315), processing is executed to judge whether a steering angle θAm-off, which was at a previous cycle memorized at the nonvolatile memory 161, is less than −180 degrees.

That is as is illustrated in FIG. 7B, at a time that the steering angle θAm-off is less than −180 degrees, a rotational range θN2LK of the steering wheel 21 has been restrained to a range "−360 degrees<θN2LK≦−180 degrees". Therefore, even if the steering wheel 21 is assumed to have been positioned at the most left side position (−360 degrees, i.e., 360 degrees from the neutral steering position N to the left) at a state where the IGSW has been made off, the steering wheel 21 can be prevented from rotating to a further right-side rotational range (A=0) beyond a position of −180 degrees. Therefore, when the steering angle θAm-off is less than −180 degrees, the actual rotational range A of the steering wheel 21 can be determined to have been at A=−2.

On the other hand, at a time that the steering angle θAm-off is not less 180 degrees, a rotational range θN2LK of the steering wheel has been restrained to a range "−180 degrees≦θN2LK<0 degree". Therefore, even if the steering wheel 21 is assumed to have been positioned at the neutral steering position (absolute steering angle θAm=0 degree) that represents the most right-side position in a state where IGSW has been made off, the steering wheel 21 can be prevented from rotating to a further left-side rotational range (A=−2) beyond a position of −180 degrees. Therefore, when the steering angle θAm-off is not less than −180 degrees, the actual rotational range A of the steering wheel 21 can be determined to have been at A=0.

Therefore, when the steering angle θAm-off is determined to have been less than −180 degrees, i.e., when an affirmative answer Yes is obtained at Step S321, the program proceeds to step S323, thereby selecting the calculated motor electrical angle θMe(A) falling at a rotational range A=−2. On the other hand, at Step S321, when the steering angle θAm-off is not determined to have been less than −180 degrees, i.e., when a negative answer No is obtained at Step S321, the program proceeds to Step S325, thereby selecting the calculated motor electrical angle θMe(A) falling at a rotational range A=0.

That is, at a time that the steering angle θAm-off exceeds 180 degrees, a rotational range θN2LK of the steering wheel 21 has been restrained to a range "180 degrees<θN2LK≦360 degrees". Therefore, even if the steering wheel 21 is assumed to have been positioned at the most right side position (360 degrees, i.e., 360 degrees from the neutral steering position N to the right) at a state where the IGSW has been made off, the steering wheel 21 can be prevented from rotating to a further left-side rotational range (A=−1) beyond a position of 360 degrees. Therefore, when the steering angle θAm-off exceeds 180 degrees, the actual rotational range A of the steering wheel 21 can be determined to have been at A=1.

On the other hand, at a time that the steering angle θAm-off do not exceeds 180 degrees, a rotational range θN2LK of the steering wheel has been restrained to a range "0 degree≦θN2LK<180 degrees". Therefore, even if the steering wheel 21 is assumed to have been positioned at the neutral steering position (absolute steering angle θAm=0 degree) that represents the most left-side position in a state where IGSW has been made off, the steering wheel 21 can be prevented from rotating to a further right-side rotational range (A=1) beyond a position of 180 degrees. Therefore, when the steering angle θAm-off do not exceed 180 degrees, the actual rotational range A of the steering wheel 21 can be determined to have been at A=−1.

Therefore, when the steering angle θAm-off is determined to have exceeded 180 degrees, i.e., when an affirmative answer Yes is obtained at Step S331, the program proceeds to step S333, thereby selecting the calculated motor electrical angle θMe(A) falling at a rotational range A=1. On the other hand, at Step S331, when the steering angle θAm-off is not determined to have exceeded 180 degrees, i.e., when a negative answer No is obtained at Step S331, the program proceeds to Step S335, thereby selecting the calculated motor electrical angle θMe(A) falling at a rotational range A=−1.

As described above, after selecting the calculated motor electrical angle θMe(A) at each step S323, S325, S333, and S335, at the successive step S341, the CPU 61 judges whether the calculated electrical angle θMe(A) at each step is appropriate or not. Further, at step S343, an absolute steering angle θAm is computed in accordance with the equation (4) described above. As described above, an absolute position of the steering wheel 21 is obtained so that a series of absolute position detecting processing (part 2) is terminated normally.

Figure 14:
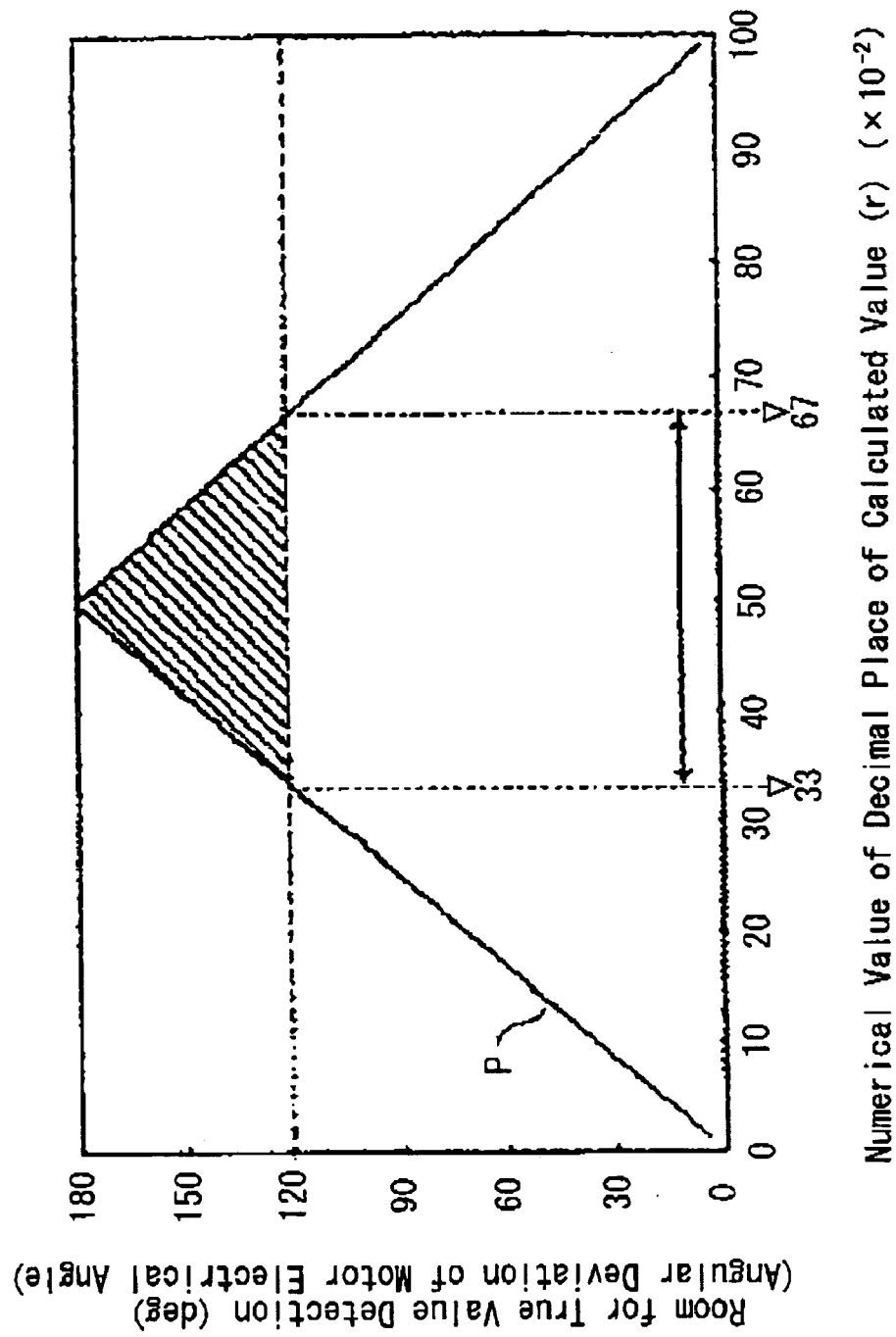
FIG. 14 is a characteristic graph (zigzag line P) showing the variation of a room for true-value detection in connection with a numerical value of the decimal place of the calculated value (r)
Figure 15A:
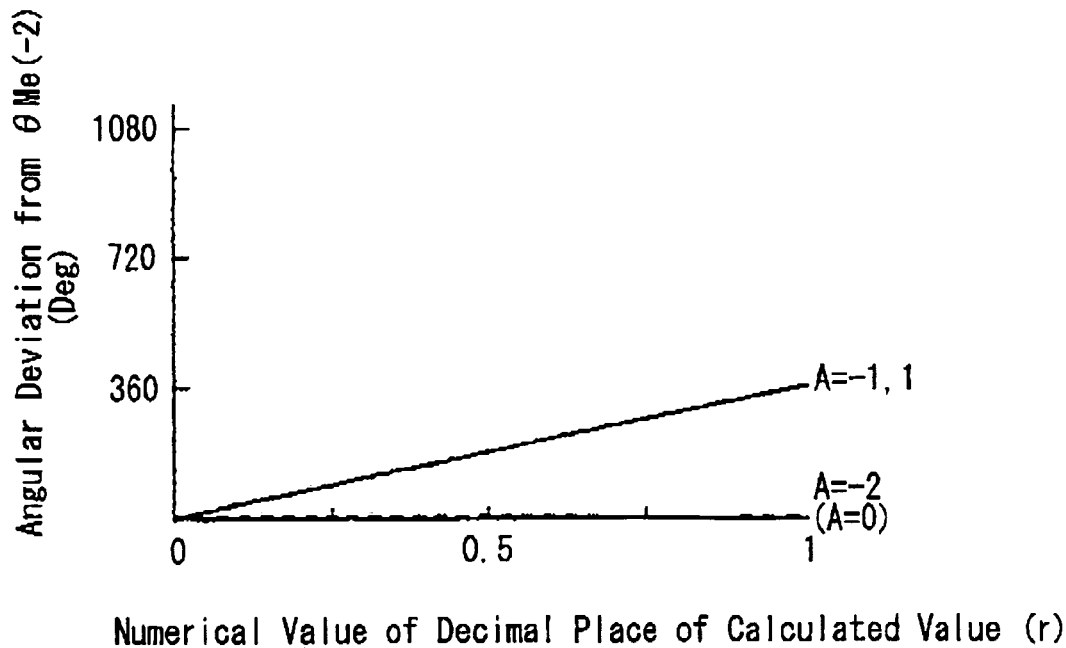
FIG. 15A is a characteristic graph showing the deviations from calculated motor electrical angles $\theta Me$ (−2) in connection with the variation in a numerical value of the decimal place of the calculated value (r)
Figure 15B:
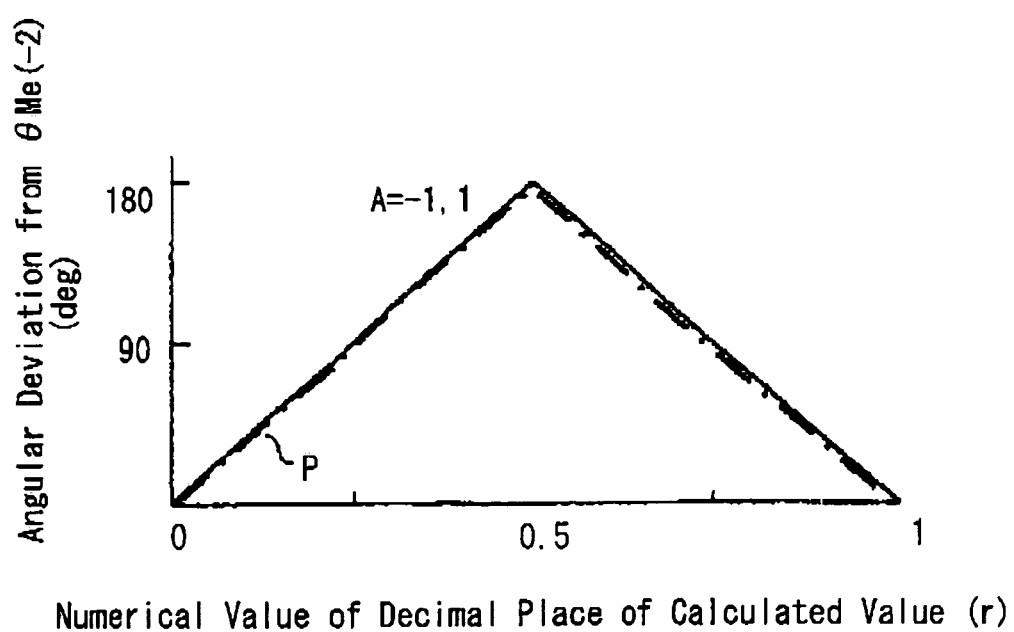
FIG. 15B is a similar characteristic graph (zigzag line P) wherein the deviations shown in FIG. 15A are represented as being turned back each time of reaching the deviation of 180-degrees.

Next, the grounds for the characteristic chart (zigzag line P) in FIG. 14 representing the variation in the room for the true value detection in relation to the numerical values of the decimal place of the calculated value (r) will be described with reference to FIGS. 15A and 15B. FIG. 15A shows the characteristic representing the variation of the deviations from the calculated motor electrical angle θMe(−2) in relation to the numerical values of the decimal place of the calculated value (r).

As having been described with reference to FIG. 15B, where the numerical value of the decimal place of the calculated value (r) is set to 0.50, "values αe and γe" and "values βe and δd, which both have the same value, appear at two portions (A=−2,0 and A=−1,1) for any of the four-kind rotational amounts (A=−2, −1, 0, 1) of the steering wheel 21, and therefore, it is unable to distinguish the true value from the false values. That is, in FIG. 15A, where the numerical value of the decimal place of the calculated value (r) is set to 0.50, the same value is taken at A=−2,0 or at A=−1,1, wherein it is not possible to distinguish from each other.

Meanwhile, where the deviations of the calculated motor electrical angle θMe(A) from the base of the broken line for A=−2 are calculated in the respective cases of A=−1, and A=1 as the numerical value of the decimal place of the calculated value (r) is varied from 0 to 1, it would be understood that a relationship shown in FIG. 15A exists among them. And, where the respective deviations so calculated are represented as being turned back each time of reaching 180 degrees, there can be obtained a characteristic chart of a chevron shape as shown in FIG. 15B. The broken lines for A=−2 and 0 are omitted in FIG. 15B.

More specifically, while the solid line for A=−1 and 1 increases linearly from 0 to 360 degrees in FIG. 12A, it turns back each time of reaching 180 degrees in FIG. 12B. Thus, the solid line in FIG. 12B turns back each time the numerical value of the decimal place of the calculated value (r) reaches 0.5, thereby to decrease linearly with a negative inclination and thus, forms a zigzag line (solid line) drawing an isosceles triangle.

Where the calculated motor electrical angle θMe(−2) in the case of A=−1, 1 is assumed as the true value, each of the zigzag lines represented above shows that as the deviation from the broken line for A=−2 comes close to 0 (zero), the confusion tends to arise between the calculated motor electrical angle θMe(−2) as the true value and the calculated motor electrical angles θMe(−1), θMe(0) and θMe(1) respectively as other false values. Therefore, where the false values each of which is closest to the electrical angle θMe(−2) as the true value at each of the numerical values of the decimal place are selected from the zigzag lines, the zigzag line P (represented by the thick line in FIG. 15B) can be generated. That is, this zigzag line P is the characteristic, as described with reference to FIG. 14, which represents the variation in the room for the true value detection in relation to the numerical values of the decimal place of the calculated value (r).

According to the electric power steering apparatus 20 which executes this absolute position detecting processing (part 2), an absolute steering angel θAm of the steering wheel 21, which was obtained immediately before making off the IGSW, is memorized at the nonvolatile memory 161 as an IG-off steering angle θAm-off. After making the IGSW on, on the basis of the latest steering angle θAm-off memorized in the nonvolatile memory 161 and a rotational range of the steering wheel 21 which is restrained to less than 180 degrees by the lock mechanism 130, an absolute steering angle θAm of the steering wheel 21, which is obtained from the electrical angle θT1, the electrical angle θT2, and the actual motor electrical angle θMe, can be specified, at Steps S301, S303, S321, S323, S345, S331, S333, and S335 of the absolute position detecting processing (part 2) from among plural rotational ranges A=−2 or 0, or from among plural rotational ranges A=−1 or 1.

Accordingly, according to the first embodiment of the present invention, even where an absolute steering angle θAm of the steering wheel 21 is specified from among plural rotational ranges A=−2 or 0, or from among plural rotational ranges A=−1 or 1, it is possible to precisely detect an absolute steering angle θAm, thereby enabling to control the motor 40 to assist a steering manipulation on the basis of the absolute steering angle θAm of the steering wheel 21.

In the electric power steering apparatus according to the second embodiment of the present invention, a calculated value r, which is obtained by multiplying a speed reduction gear ratio of the ball screw mechanism 50 with the number of pole pairs of the motor resolver 44, is set in such a manner that a numerical value of the decimal place of the calculated value r is set to 0.33 for example. It is the essential requirement that the product is to be a non-integer with a numerical value of the decimal place. In this particular embodiment, when the number of pole pairs of the motor resolver 44 is set to 7 for example, the speed reduction gear ratio of the ball screw mechanism 50 (i.e., the speed reduction gear mechanism) can be set to 8.19 for example. In this case, the calculated value r becomes 57.33 (=8.19×7), and the numerical value of the decimal place is 0.33.

When the numerical value of the decimal place of the calculated value (r) is set to 0.33, it is possible to increase the room for the true value detection by lifting a peak point of the zigzag line K illustrated in FIG. 8. It is therefore possible to lift an error zone boundary (illustrated as the one-dot chain line in FIG. 8) and a lower limit value for an angular deviation from the calculated motor electrical angle θMe (A). A room (i.e., 60 degrees) for the true value detection calculated in this manner is illustrated as the broken line in FIG. 8.

As described above, in the electric power steering apparatus 20 according to the second embodiment of the present invention, even where an error in dimensional precision of mechanical components which configure the steering mechanism is remarkably large, it is possible to detect precisely an absolute steering angle θAm of the steering wheel 21.

However, when the numerical value of the decimal place of the calculated value r is set to 0.33, as is summarized in FIGS. 7A and 7B, values αd and δd, which both have the same value, appear at two locations (A=−2 and A=1). In such circumstances, when either the value αd or δd is a true value, it is not possible to distinguish the true value from among these two values. That is, it is possible to detect a rotational amount of the steering wheel 21 only within a rotational range A=−2, −1 and 0 or within a rotational range A=−1, 0 and 1. Hereinafter, an electric power steering apparatus, according to which a rotational amount of the steering wheel 21 can be detected at any of four-kind rotational ranges A=−2, −1, 0 and 1, can be referred to as "N4-type", while an electric power steering apparatus, according to which a rotational amount of the steering wheel 21 can be detected either at rotational ranges A=−2, −1 and 0 or at rotational ranges A=−1, 0 and 1, can be referred to as "N3-type".

In FIG. 7A, with respect to the neutral position of the steering wheel 21 as the steering center, one rotational range (0<θ≦360 degrees) to the right (i.e., in a clockwise direction) is set as A=0, and another successive rotational range (360 degrees<θ≦720 degrees) to the right is set as A=1, while, with respect to the neutral position of the steering wheel 21 as the steering center, one rotational range (0>θ≧−360 degrees) to the left (i.e., in a counterclockwise direction) is set as A=−1, and another successive rotational range (−360 degrees>θ≧−720 degrees) to the left is set as A=−2.

Figure 20:
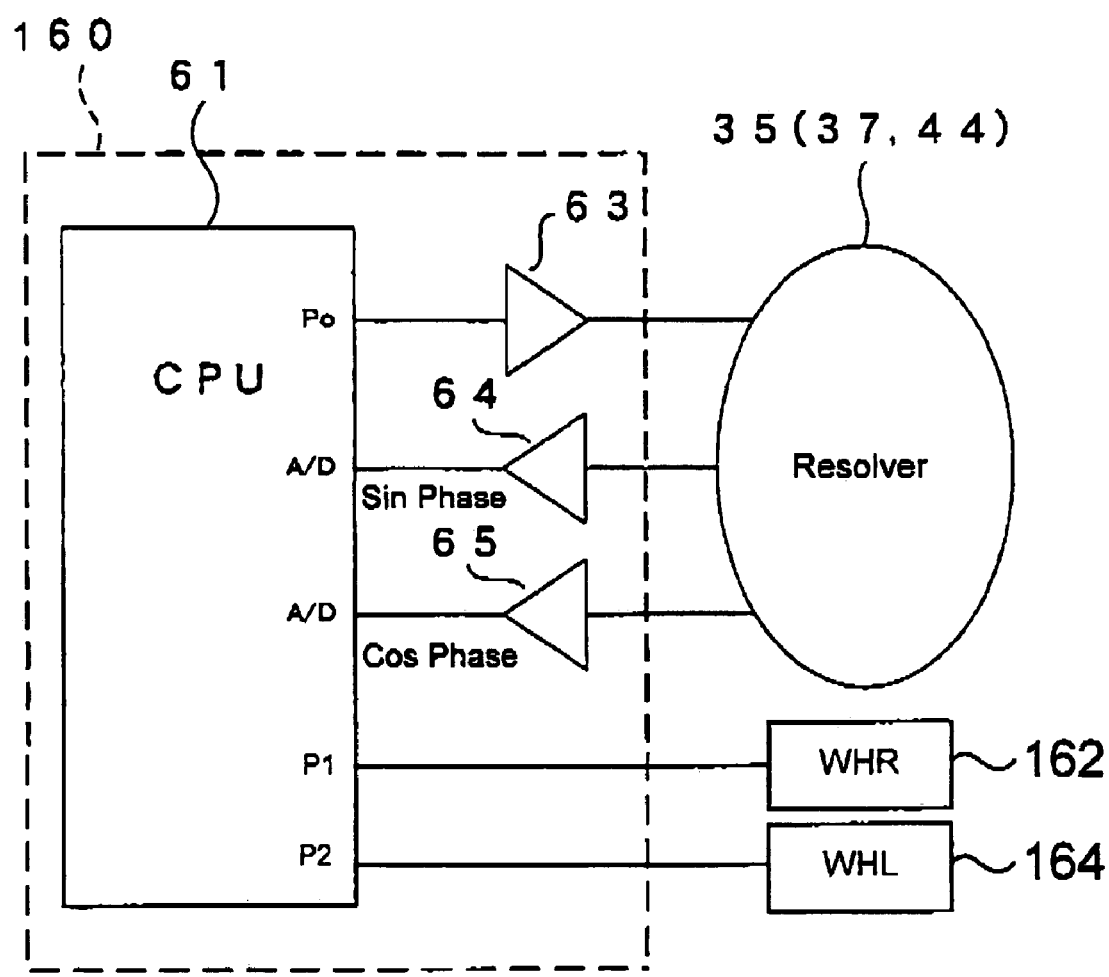
FIG. 20 is a block diagram showing the configuration in connection between an ECU controlling the electric power steering apparatus according to the second embodiment and each of the resolvers.

In the electric power steering apparatus 20 according to the second embodiment of the present invention, with no changes in the structure of the electric power steering apparatus 20 of the above incorporated US Patent Application Publication, namely the lock mechanism 130 of the first embodiment is not needed, even where a numeral value of the decimal place of a calculated value (r) is set to 0.33 ("N3-type"), it is possible to specify a true value from among the values "αd and δd" having the same value and further possible to precisely detect an absolute steering angle θAm of the steering wheel 21 within the same steering angle range of "N4-type". Further, as described later, if required, where the structure illustrated in FIG. 20 is employed, it is possible to precisely detect a true value from among the values "αd and δd" having the same value even through an absolute position detecting processing (part 3) in FIG. 21.

<Absolute Position Detecting Processing (Part 1)>

Figure 17:
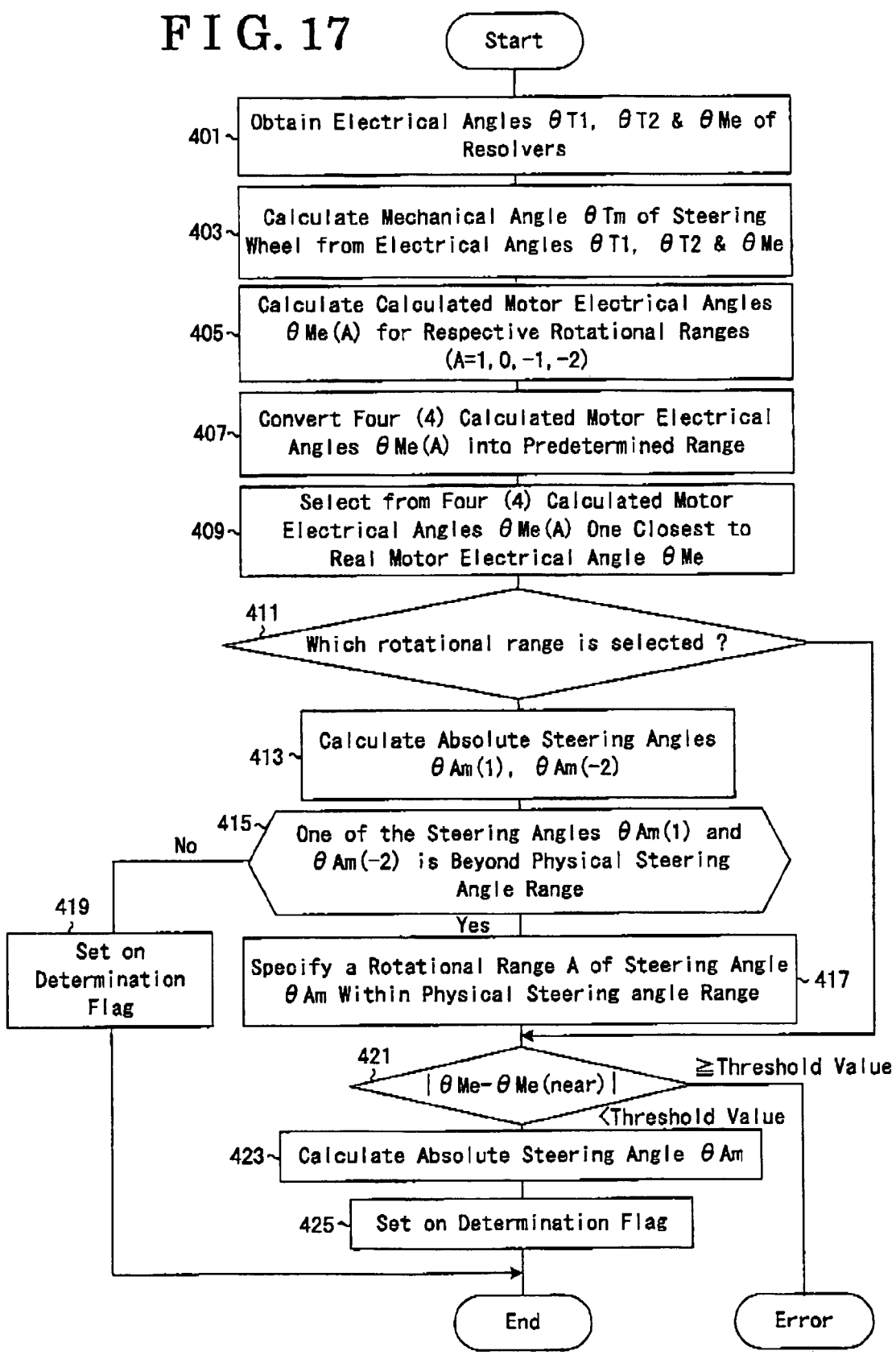
FIG. 17 is a flowchart showing the flow of absolute position detecting processing (part 1) according to a second embodiment of the present invention.
Figure 22:
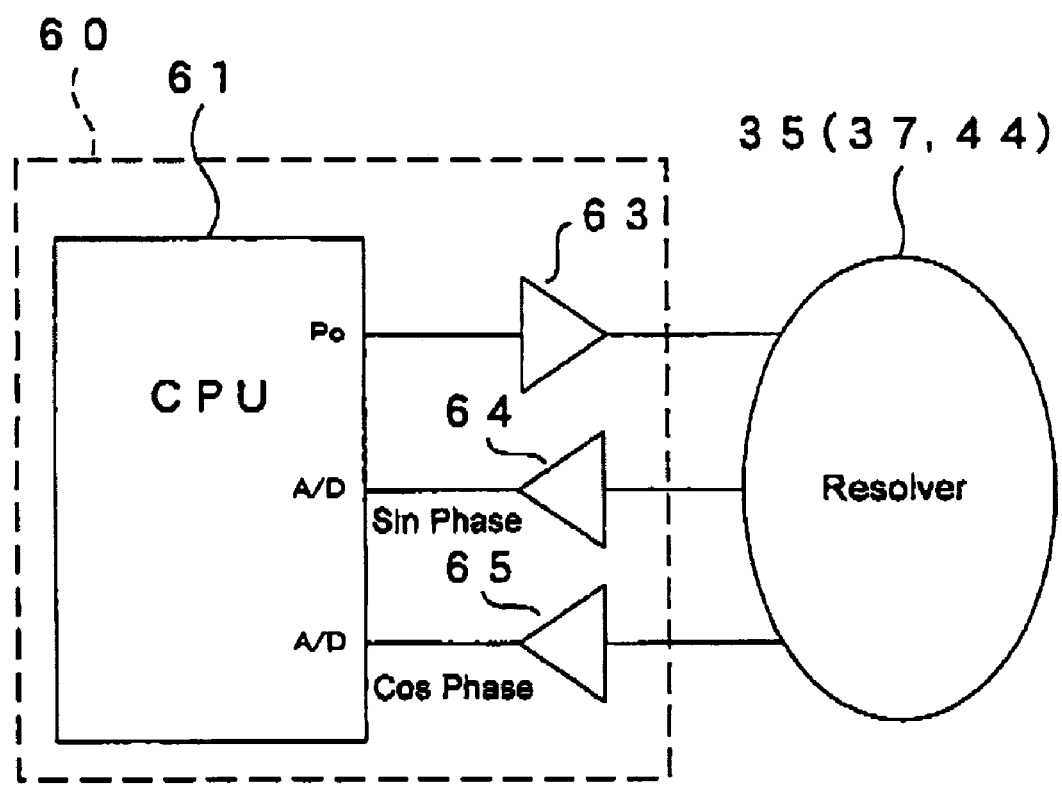
FIG. 22 is another block diagram showing the configuration in connection between an ECU controlling the electric power steering apparatus.

As is illustrated in FIG. 17, an absolute position detecting processing (part 1) illustrated in FIG. 17 is built with Steps S401 through S425. At Steps S401, S403, S405, S407, S409, S421, and S423, the same processing is executed respectively as that at Steps S205, S207, S209, S211, S213, S223 and S225 of FIG. 10. Therefore, explanation of the processing at these steps is omitted herein. The absolute position detecting processing (part 1) of FIG. 17 is executed by the CPU 61 of the ECU 50 illustrated in FIG. 22.

The absolute position detecting processing (part 1) is executed immediately after making the IGSW on. In the first place, at step S401, processing for acquiring the electrical angles θT1, θT2, θMe of the resolvers 35, 37, 44 is executed. At steps S403, S405, and S407, processing is executed to obtain four calculated motor electrical angles θMe(A). At step S409, processing is executed to select from among the four calculated motor electrical angles θMe(A), one which is closest in value to an actual motor electrical angle θMe (hereafter referred to as "real motor electrical angle θMe" to be distinguished from the calculated motor electrical angles θMe(A)).

However, as having been described with reference to FIG. 7A, where the numerical value of the decimal place of the calculated value (r) is set to 0.33, values αd and δd, which both have the same value, appear at two portions (A=−2 and 1) for any of the four-kind rotational amounts (A=−2, −1, 0, 1) of the steering wheel 21. That is, at Step S409, it is on occasions necessary to select, from among the two values αd and δd which both have the same value appear at two portions (A=−2 and 1), one of them which is closest in vale to a real motor electrical angle θMe. Therefore, where the selected calculated motor electrical angle θMe(A) appear at A=−2 or 1, the following steps S413 to 425 can be executed by the CPU 61. At the successive steps S411, processing is executed to determine to which rotational amount, from among four-kind rotational amounts (=−2, −1, 0, 1), the calculated motor electrical angle θMe(A) selected at Step S409 corresponds. When the rotational range A of the calculated motor electrical angle θMe(A) falls at A-1 or −2, the program proceeds to step S413. On the other hand, when the rotational range A of the calculated motor electrical angle θMe(A) falls at A=0 or −1, as is summarized in FIG. 7A, it is possible to specify a rotational range such as βd (A=−1) and δd (A=0). In this case, there is no need to execute steps S413 to 419, and the successive step can be Step S421.

After determining, at step S411, that the calculated motor electrical angle θMe(A) selected at Step S409 corresponds to the rotational amount A=1 or −2, or to the rotational amounts A=1 and −2, the program proceeds to step S413, wherein the CPU 61 calculates an absolute steering angle θAm(1) and θAM(-2). In succession, at Step S415, the CPU 61 judges if one of the calculated absolute steering angles θAm(1) and θAM(-2) is beyond a range, in which the steering wheel 21 can rotate. This range, in which the steering wheel 21 can rotate, is referred to as "physical steering angle range". This physical steering angle range corresponds to a two-rotational range to the left (A=-2), a one-rotational range to the left (A=-1) a one-rotational range to the right (A=0) and a two-rotational range to the right (A=1).

Where, at step S415, one of the absolute steering angles θAm(1) and θAM(-2) is judged to have been beyond a range, in which the steering wheel 21 can rotate, (i.e., an affirmative answer Yes at step S415), the program proceeds to step S417 so as to specify a rotational range A of the absolute steering angle θAm within the physical steering angle range.

Figure 19A:
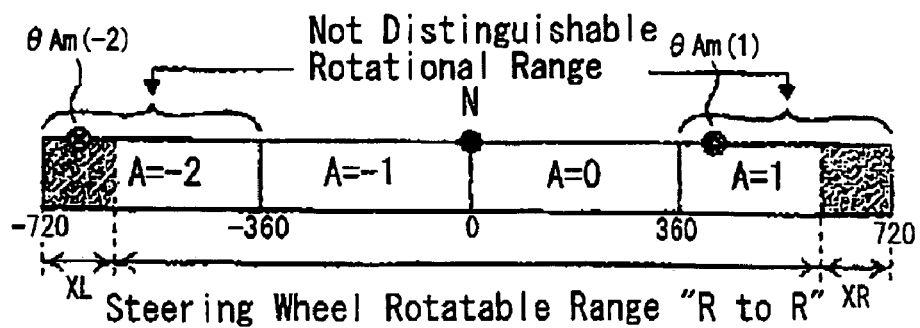

In FIG. 19A, the absolute steering angle θAm(-2) is judged to have been beyond the physical steering angle range at step S415 and exists, as indicated by the "x" encircled mark, at an outside range XL which deviates to the left from a range R to R, in which the steering wheel 21 can rotate. In such a case, it is possible to judge that the absolute steering angle θAm(-2) is a false value which indicates a position to which the steering wheel can not rotate. Therefore, on the basis of the processing result at step S415, the absolute steering angle θAm(1), as indicated by the double circled mark in FIG. 19A, exists at the range R to R, in which the steering wheel 21 can rotate, and is judged as a true value. The range R to R, in which the steering wheel 21 can rotate, is defined for example at positions corresponding to plus minus 630 degrees from the neutral steering position N of the steering wheel 21 indicated by a black circled mark.

Figure 19B:
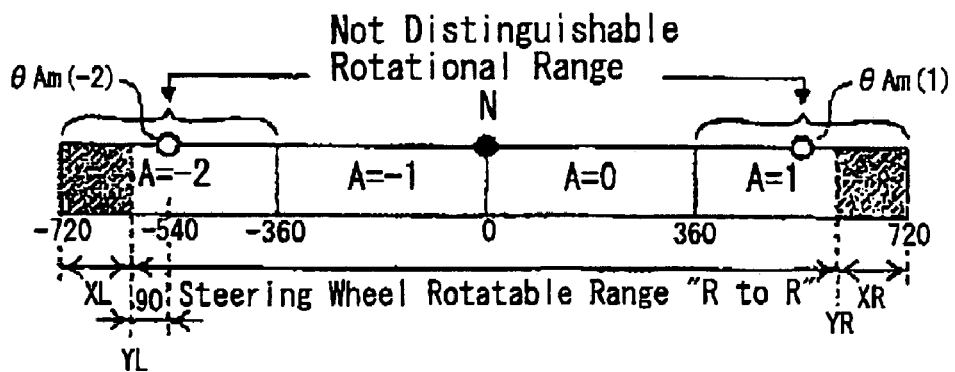

On the other hand, as illustrated in FIG. 19B, where both of the steering wheel angles θAm(1) and θAm(-2), both indicated by white circled marks, are judged to have existed at the range R to R, in which the steering wheel 21 can rotate, a negative answer "No" is obtained at step S415. That is, at step S415, any of the steering wheel angles θAm(1) and θAm(-2) are not judged to have been beyond the physical steering angle range. In such circumstances, it is not possible to distinguish both of them. Therefore, the program proceeds to step S419, wherein a determination flag is set off. As described above, this absolute position detecting processing (part 1) is terminated, and a later-described absolute position detecting processing (part 2) is employed so as to distinguish both of them and to obtain an absolute steering angle θAm.

Where a rotational range A of the absolute steering angle θAm, which falls at the physical steering angle range, is specified at step S417, the program proceeds to steps S421 and S423 so as to calculate an absolute steering angel θAm. At step S425, the determination flag is then set on. This determination flag is set on at an event that the rotational range of the absolute steering angle θAm is specified, and is set off at an event that the rotational range thereof is not specified. Therefore, when both of the absolute steering angle θAm(1) and θAm(-2) are judged to have been within the physical steering angle range, the determination flag is set off at step S419.

In FIG. 19A, the absolute steering angle θAm for example exists at the outside range XL which deviates to the left from the range R to R, in which the steering wheel 21 can rotate. Alternatively, even when an absolute steering angle θAm(1) exists at an outside range XR which deviates to the right from the range R to R, the absolute rotational angle θAm (-2) is specified and the processing at Step S421 can be executed in the same way.

As described above, according to the electric power steering apparatus 20 of the second embodiment which performs the absolute position detecting processing (part 1) of FIG. 17, at a time that one of the absolute steering angles θAm(1) and θAm(-2), both of which are two possible absolute rotational positions, does not exist at any of the rotational ranges A=-2, -1, 0 and 1 of the steering wheel 21, and the other one thereof exists at any of the rotational ranges A=-2, -1, 0 and 1 of the steering wheel 21, a rotational range A of an absolute steering angle θAm can be specified on the basis of the other one of the absolute steering angles θAm(1) and θAm(-2).

Therefore, even where an absolute steering angle θAm of the steering wheel 21, which is obtained from the electrical angles θT1, θT2, and θMe of the first and second resolvers and of the electric motor, is specified from the two absolute steering angles θAm(1) and θAm(-2), it is possible to specify, as an absolute steering angle θAm of the steering wheel 21, one of the absolute steering angles θAm(1) and θAm(-2). In such circumstances, even where the steering wheel 21 can not be operated easily, e.g., at a time of parking a vehicle, it is possible to precisely detect an absolute steering angle θAm of the steering wheel 21, and is further possible to control the motor 40 to assist a steering manipulation on the basis of the absolute steering angle θAm of the steering wheel 21 detected as described above.

<Absolute Position Detecting Processing (Part 2)>

Next, described below is an example of an absolute position detecting processing (part 2) by which both of the absolute steering angles θAm(1) and θAm(-2), both indicated by white circled marks, can be distinguished therefrom, even when both of the absolute steering angles exists in the physical steering angle range. This absolute position detecting processing (part 2) is executed by the CPU 61 of the ECU 60 illustrated in FIG. 22, and is repeatedly performed as a timer-based interruption every regular time interval after the absolute position detecting processing (part 1).

Figure 18:
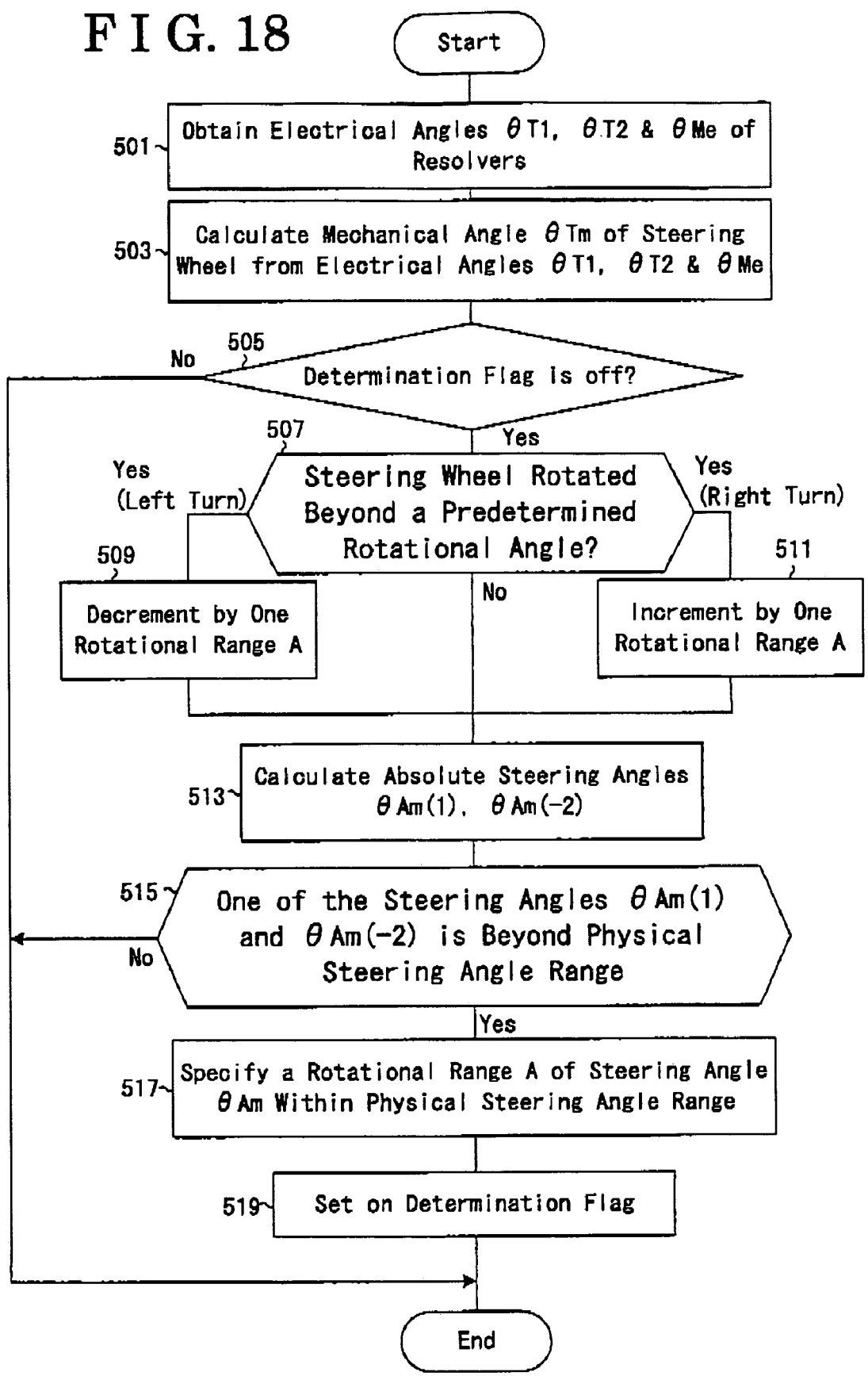
FIG. 18 is a flowchart showing the flow of absolute position detecting processing (part 2) according to the second embodiment of the present invention.

As is summarized in FIG. 18, in the first place, at step S501, processing for acquiring the electrical angles θT1, θT2, θMe of the resolvers 35, 37, 44 is executed. At step S503, processing is executed to calculate a mechanical angle θTm of the steering wheel 21 from the electrical angles θT1, θT2 and to memorize the calculated mechanical angle θTm at a memory storage. In this case, the memory is embedded in, or mounted on, the ECU 60, and is connected, by means of a bus, to the CPU 61. The memory can be represented, for example, by a DRAM that is capable of providing a working area employed upon a calculation processing by the CPU 61.

At step S505, the CPU 61 judges whether the determination flag has been set off. That is, at step S505, the CPU 61 judges whether a rotational range of an absolute steering angle θAm could be specified through the absolute position detecting processing (part 1). When the determination flag has not been set off at step S505, (i.e., a negative answer "No" at step S505), a rotational range of the absolute steering angle θAm has been specified already through the absolute position detecting processing (part 1). In such a case, no more processing is executed through this absolute position detecting processing (part 2).

On the other hand, when the determination flag has been set off at step S505, (i.e., an affirmative answer "Yes" at step S505), the program proceeds to step S507, wherein processing is executed to determine whether the steering wheel 21 has rotated beyond a predetermined rotational angle. That is, at step S507, processing is executed to read out a mechanical angle θTm' and calculate an angle difference Δθ between the mechanical angle θTm' memorized at the memory storage at step S503 and the mechanical angle θTm of this time. Therefore, on the basis of the absolute value of the angle difference Δθ, the CPU 61 can judge whether the steering wheel 21 has rotated beyond the predetermined rotational angle.

In other words, the CPU 61 judges the presence, or not, of the rotation of the steering wheel 21, depending on whether the absolute value of the angle difference Δθ has exceeded the predetermined rotational angle. When the CPU 61 judges that the steering wheel 21 has rotated beyond the predetermined rotational angle, and a rotating direction of the steering wheel 21 is a counterclockwise direction (i.e., in a left-side direction), the program proceeds to step S509, thereby reducing by one the value of the rotational range A of the absolute steering angle θAm.

On the other hand, when the CPU 61 judges that the steering wheel 21 has rotated beyond the predetermined rotational angle, and a rotating direction of the steering wheel 21 is a clockwise direction (i.e., in a right-side direction), the program proceeds to step S511, thereby increasing by one the value of the rotational range A of the absolute steering angle θAm. Herein, a rotational direction of the steering wheel 21 is determined in accordance with a predetermined algorithm on the basis of a code (plus and minus) of the angle difference Δθ.

On the other hand, where the angle difference Δθ has not exceeded the predetermined rotational angle, a negative answer "No" is obtained at step S507. In this case, the processing at steps S509 and 511 is not executed, and the program proceeds directly to step S513.

Figure 19C:
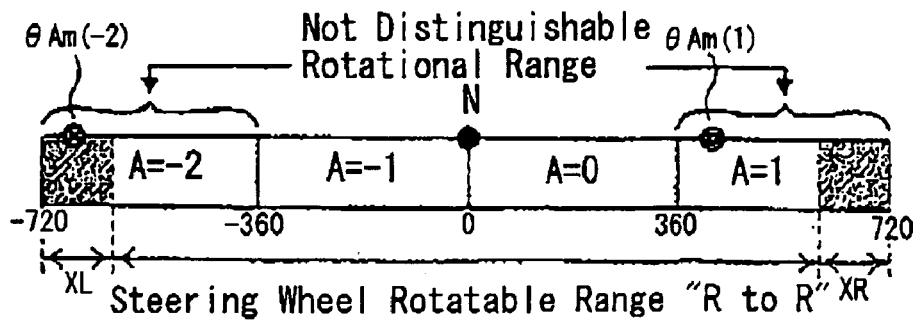

As described above, when the steering wheel 21 is judged, at step S507, to have rotated beyond the predetermined rotational angle, one of the absolute steering angles θAm(1) and θAm(-2), which have both existed within the range R to R, in which the steering wheel 21 can rotate, is shifted outside of the range R to R, as is illustrated in FIG. 19C. As a result, it is possible to distinguish them: one is the absolute steering angle θAm(-2), which exists outside the range R to R, and the other one is the absolute steering angel θAm(1), which exists inside the range R to R, thereby enabling to execute this absolute position detecting processing (part 2) in the same way as the aforementioned absolute position detecting processing (part 1).

Where this range R to R, in which the steering wheel 21 can rotate, is defined for example at positions corresponding to plus minus 630 degrees from the neutral steering position N of the steering wheel 21 indicated by a black circled mark, as illustrated in FIG. 19B, the predetermined rotational angle of the steering wheel 21 is defined at 90 degrees which is an angle difference between a boundary YL (-630 degrees) of the outside range XL and the two-rotational range A=-2 and a central position (-540 degrees) of the two-rotational range to the left.

At step S513, on the basis of the rotational position of the absolute steering angle θAm, which was shifted at step S509 or S511, or not, the CPU 61 calculates an absolute steering angle θAm for the rotational positions A=1, -2. At the successive step S515, the CPU 61 judges whether one of the absolute steering angles θAm(1) and θAm(-2) is beyond the physical steering angle range.

When an affirmative answer "Yes" is obtained at step S515, the program proceeds to step S517, wherein processing is executed to specify a rotational range A of the absolute steering angle θAm which falls within the physical steering angle range.

That is, when the steering wheel 21 is rotated beyond the predetermined angle, at step S417, as illustrated in FIG. 19C, the absolute steering angle θAm calculated at step S515, such as the absolute steering angle θAm(-2) indicated by the "x" encircled mark, appears at the outside range XL which deviates to the left from the range R to R. In such circumstances, it is possible to judge that the absolute steering angle θAm(-2) indicated by the "x" encircled mark is a false value at which the steering wheel 21 can not rotate. Hence, the value, which exists within the physical steering angle range and is not such a false value, e.g. the absolute steering angle θAm indicated by a double circled mark in FIG. 19C, can be identified as a true value, thereby enabling to specify a rotational range A of the absolute steering angle θAm.

Where a rotational range A of the absolute steering angle θAm is specified at step S517, the program proceeds to step S519, wherein the determination flag is made on. This determination flag is set on at a time that a rotational range of the absolute steering angle θAm is specified, and is set off at a time that a rotational range of the absolute steering angle θAm has not been specified. Therefore, when this processing is terminated half way at step S515, processing in connection with the determination flag at step S519 is not executed.

As illustrated in FIGS. 25B and 25C, described above is a case in which an absolute steering angle θAm exists in the outer range XL that deviates to the left side from the range R to R. Alternatively, even where the absolute steering angle θAm(1) exists in the outer range XR which deviates to the right from the range R to R, it is possible to specify the absolute steering angle θAm(-2) at step S517. Therefore, processing thereafter can be executed in the same way as described above.

As described above, according to the electric power steering apparatus 20 of the second embodiment which performs the absolute position detecting processing (part 2) of FIG. 18, where the absolute steering angles θAm(1) and θAm(-2), both of which are two possible absolute rotational positions, both exist at any of the rotational ranges A=-2, -1, 0 and 1 of the steering wheel 21, at an event that one of the two absolute steering angles θAm(1) and θAm(-2) do not appear, in response to rotation of the steering wheel 21 beyond the predetermined rotational angle, at any of the rotational ranges A=-2, -1, 0 and 1 of the steering wheel 21, the other one thereof is specified as a rotational range A of the absolute steering angle θAm.

Therefore, even where an absolute steering angle θAm of the steering wheel 21, which is obtained from the electrical angles θT1, θT2, and θMe of the first and second resolvers and of the electric motor, is specified from the two absolute steering angles θAm(1) and θAm(-2), it is possible to specify, as an absolute steering angle θAm of the steering wheel 21, one of the absolute steering angles θAm(1) and θAm(-2) in response to rotation of the steering wheel 21 beyond the predetermined rotational angle. In such circumstances, regardless of a vehicle condition such as a vehicle parking or driving maneuver, as far as the steering wheel 21 has rotated beyond the predetermined rotational angle, it is possible to precisely detect an absolute steering angle θAm of the steering wheel 21, and is further possible to control the motor 40 to assist a steering manipulation on the basis of the absolute steering angle θAm of the steering wheel 21 detected as described above, regardless of a vehicle driving condition.

<Absolute Position Detecting Processing (Part 3)>

Next, described below is an absolute position detecting processing (part 3), with reference to FIGS. 26 and 26, according to which it is possible to more precisely specify a true value rather than by the above-described absolute position detecting processing.

As is illustrated in FIG. 20, the absolute position detecting processing (part 3) is executed by the CPU 61 to which vehicle wheel speed sensors 162 and 164 are connected via input ports P1 and P2. The vehicle wheel speed sensors 162 and 164 can detect vehicle speeds of left and right vehicle wheels, respectively. This processing (part 3) can be repeatedly implemented as a timer-based interruption after the absolute position detecting processing (part 1).

Each vehicle wheel speed sensor 162 and 164 is configured so as to output a pulse signal of which frequency is repeatedly increased and decreased in response to an increase/decrease of the vehicle wheel speed. The vehicle wheel speed sensor 162 detects a vehicle wheel speed WH-R of a front-right wheel of a vehicle, while the vehicle wheel speed sensor 164 detects a vehicle wheel speed WH-L of a front-left wheel of the vehicle. Each vehicle speed sensor 162 and 164 is mounted on each vehicle wheel. Alternatively, a vehicle wheel speed sensor can be configured so as to detect all four wheel speeds of the vehicle. In this case, it is possible to precisely detect a vehicle wheel speed by detecting a difference between the speed of the front-left wheel and the speed of the front-right wheel in combination with two wheel speed sensors which are mounted on left and right vehicle wheels that are arranged diagonally relative to the vehicle.

Figure 21:
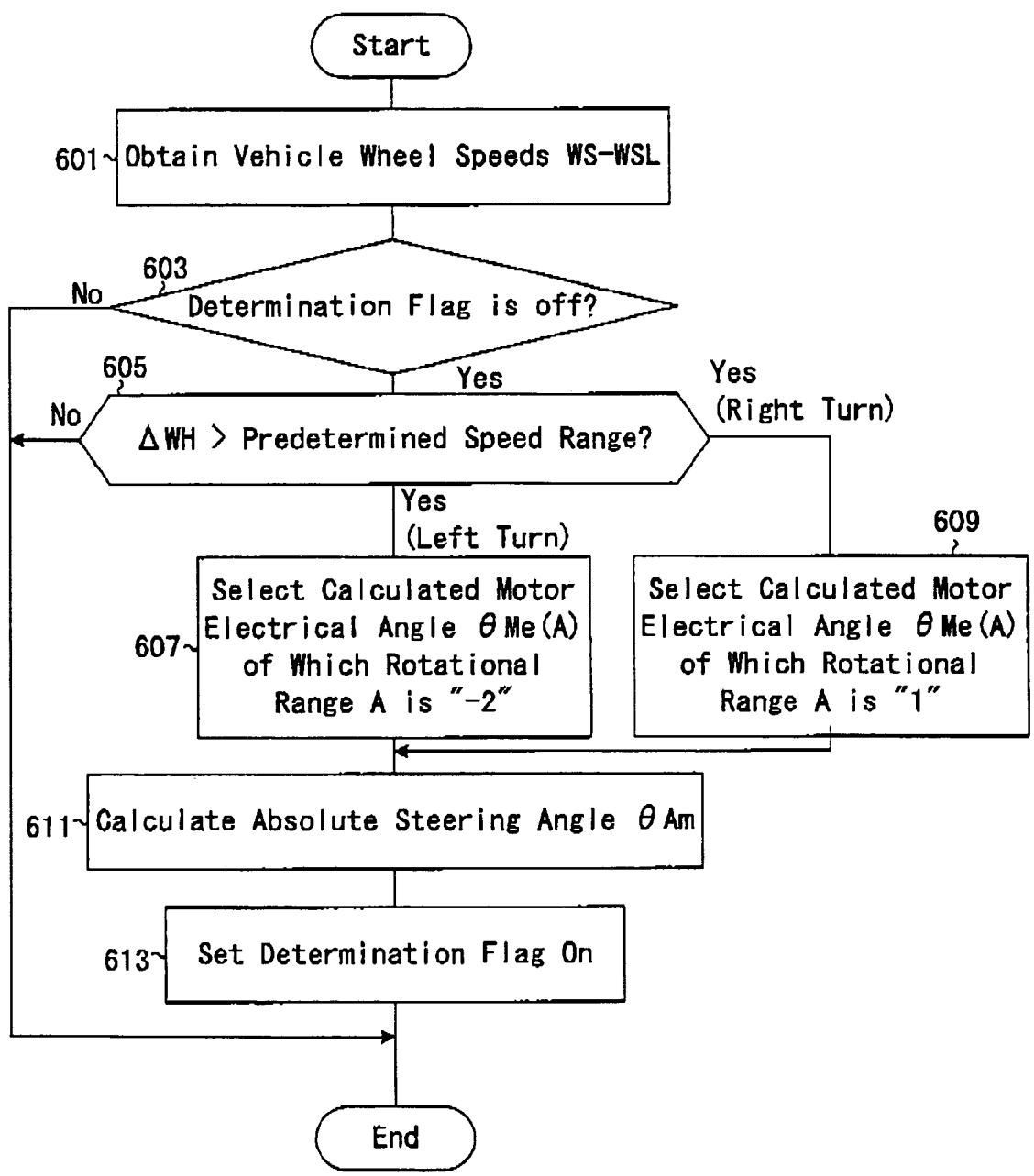
FIG. 21 is a flowchart showing the flow of an absolute position detecting processing (part 3) executed by the CPU shown in FIG. 20.

As is summarized in FIG. 21, according to the absolute position detecting processing (part 3), in the first place, at step S601, processing is executed to obtain a vehicle wheel speeds WH-R and WH-L from the vehicle wheel speed sensors 162 and 164. The information on the vehicle wheel speeds WH-R and WH-L can be obtained directly or indirectly. More specifically, pulse signals, of which frequencies vary in response to vehicle wheel speeds from the vehicle wheel speed sensors 162 and 164, are inputted into the CPU 61. Therefore, by counting the number of pulse signals, and by calculating frequency of the pulse signals (the number of counting per unit of time), the vehicle wheel speeds WH-R and WH-L can be obtained. Further, it is possible to obtain the vehicle wheel speeds WH-R and WH-L calculated by the other ECU via a memory storage or network which both are shared by this the other ECU.

At step S603, the CPU 61 judges whether the determination flag has been set off. That is, the CPU 61 judges whether a rotational range of an absolute steering angle θAm has been specified through the aforementioned absolute position detecting processing (part 1). When the determination flag has not been set off, it indicates that a rotational range of an absolute steering angle θAm has been specified through the absolute position detecting processing (part 1). Therefore, no more processing is executed.

On the other hand, when the determination flag is judged to have been set off at step S603, the program proceeds to step S605, wherein the CPU 61 judges whether a speed difference ΔWH between the wheel speed WH-R and the wheel speed WH-L has exceeded a predetermined speed range. When the speed difference ΔWH is not less than two pulses in the number of pluses, the CPU 61 determines that the speed difference ΔWH has exceeded the predetermined speed range. A rotational direction of the steering wheel 21 is determined in accordance with a predetermined algorithm on the basis of plus and minus of the speed difference ΔWH.

Therefore, at Step S605, where the speed difference ΔWH has exceeded the predetermined speed range, and a rotating direction of the steering wheel 21 is a left direction, (i.e., an affirmative answer "Yes" at step S605), even if both of the absolute steering angles θAm(1) and θAm(−2) have existed within the physical steering angle range, it is possible to select, as a true value, the absolute steering angle θAm(−2) indicated by a white circled mark in FIG. 19B. Therefore, the program proceeds to step S607 so as to specify a rotational range of an absolute steering angle θAm to A=−2.

In the same way, where the speed difference ΔWH has exceeded the predetermined speed range, and a rotating direction of the steering wheel 21 is a right direction, (i.e., an affirmative answer "Yes" at step S605), even if both of the absolute steering angles θAm(1) and θAm(−2) have existed within the physical steering angle range, it is possible to select, as a true value, the absolute steering angle θAm(1) indicated by a white circled mark in FIG. 19B. Therefore, the program proceeds to step S609 so as to specify a rotational range of an absolute steering angle θAm to A=1.

On the other hand, when the speed difference ΔWH is not judged, at step S605, to have exceeded the predetermined speed range, it is not possible to obtain a steering direction of the steering wheel 21. In such circumstances, this absolute position detecting processing (part 3) is therefore terminated so as to prepare for a next coming processing.

At Step S611, processing is executed so as to calculate an absolute position steering angle θAm. At the successive step S613, the determination flag is set on. This determination 5 flag is the same one as that explained in the absolute position detecting processing (parts 1 and 2).

According to the electric power steering apparatus 20 which executes the absolute position detecting processing (part 3) illustrated in FIGS. 26 and 27, the vehicle wheel speed sensors 162 and 164 detect the vehicle wheel speeds WH-R and WH-L. A steering direction of the steering wheel 21 is judged on the basis of the speed difference ΔWH between the vehicle wheel speeds WH-R and WH-L. A rotational range of an absolute steering angle θAm can be specified at steps 607 and 609 from among the absolute steering angles θAm(1) and θAm(−2) which both are two possible absolute rotational positions, As described above, even where an absolute steering angle θAm of the steering wheel 21 I specified from among the two absolute steering angles θAm(1) and θAm(−2), as for as the right and left vehicle wheels are steered, it is possible to one of them as an absolute steering angel θAm of the steering wheel 21. Therefore, in response to steering of vehicle wheels, it is possible to precisely detect an absolute steering angle θAm of the steering wheel 21. When a vehicle is driving, it is thus possible to control the motor 40 to assist a steering manipulation on the basis of an absolute steering angle θAm of the steering wheel 21.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An electric power steering apparatus comprising:
   a steering wheel;
   a steering shaft connected to the steering wheel;
   a steering angle sensor for detecting a rotational angle of the steering shaft as a steering angle;
   an electric motor for assisting, through a speed reduction gear mechanism, a steering operation performed by a steering mechanism connected to the steering shaft; and
   a motor resolver for detecting a motor electrical angle indicating a rotational angle of the electric motor,
   the electric power steering apparatus being capable of controlling the electric motor based on an absolute rotational position of the steering wheel, the absolute rotational position which is calculated based on the steering angle and the motor electrical angle, wherein:
   at least one of a speed reduction gear ratio of the speed reduction gear mechanism and the number of pole pairs of the motor resolver is set in such a manner that a calculated value, which is obtained by multiplying the speed reduction gear ratio of the speed reduction gear mechanism with the number of pole pairs of the motor resolver, represents a non-integer having a numerical value of the decimal place, and
   the electric power steering apparatus further comprises:
   an absolute rotational position specifying device configured to specify an absolute rotational position of the steering wheel from among plural possible absolute rotational positions that are obtained based on the steering angle and the motor electrical angle.

2. An electric power steering apparatus according to claim 1, wherein the steering angle sensor comprises:
   a first resolver for detecting a first steering angle indicating a rotational angle of the steering shaft; and
   a second resolver having pole pairs different in number from those of the first resolver, the second resolver for detecting a second steering angle indicating a rotational angle of the steering shaft.

3. An electric power steering apparatus according to claim 1, wherein the electric power steering apparatus further comprises:
   a rotational range restraining device configured to restrain a rotation of the steering wheel within a predetermined rotational range at a time that an ignition switch has been made off;
   a memory configured to memorize, as an IG-off absolute rotational position, an absolute rotational position of the steering wheel which is obtained based on the steering angles and the motor electrical angle immediately before making the ignition switch off; and
   after making the ignition switch on, the absolute rotational position specifying device specifies, based on the latest IG-off absolute rotational position memorized by the memory and the predetermined rotational range of the steering wheel restrained by the rotational range restraining device, an absolute rotational position of the steering wheel from among plural possible absolute rotational positions that are this time obtained based on the steering angles and the motor electrical angle.

4. An electric power steering apparatus according to claim 3, wherein the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left, the predetermined rotational range of the steering wheel, which is restrained by the rotational range restraining device, is less than 360 degrees, and the plural possible absolute rotational positions appear within the two-rotational range to the right and the two-rotational range to the left,
   wherein the calculated value is designed to be the non-integer having a numerical value of the decimal place, the numerical value which ranges between 0.22 and 0.39, or between 0.61 and 0.78.

5. An electric power steering apparatus according to claim 3, wherein the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left, the predetermined rotational range of the steering wheel, which is restrained by the rotational range restraining device, is less than 180 degrees, and the plural possible absolute rotational positions appear "within the one-rotational range to the right and the two-rotational range to the left" and "within the two-rotational range to the right and within the one-rotational range to the left",
   wherein the calculated value is designed to be the non-integer having a numerical value of the decimal place, the numerical value which ranges between 0.33 and 0.67.

6. An electric power steering apparatus according to claim 1, wherein the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left, and the absolute rotational position of the steering wheel, which is obtained from the steering angles and the motor electrical angle, is specified from among two possible absolute rotational positions,
   wherein, at an event that one of the two possible absolute rotational positions do not appear at any of the two-rotational range to the left, the one-rotational range to the left, the one-rotational range to the right, and the two-rotational range to the right, and the other one of the two possible absolute rotational positions appears at any of the tow-rotational range to the left, the one-rotational range to the left, the one-rotational range to the right, and the two-rotational range to the right, the absolute rotational position specifying devices specifies the other one of the two possible absolute rotational positions as the absolute rotational position of the steering wheel.

7. An electric power steering apparatus according to claim 1, wherein the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left, the absolute rotational position of the steering wheel, which is obtained from the steering angles and the motor electrical angle, is specified from among two possible absolute rotational positions,
   wherein, where both the two possible absolute rotational positions appear at any of the two-rotational range to the left, the one-rotational range to the left, the one-rotational range to the right, and the two-rotational range to the right, at an event that one of the two possible absolute rotational positions disappears, in response to rotation of the steering wheel beyond a predetermined angle, at any of the two-rotational range to the left, the one-rotational range to the left, the one-rotational range to the right, and the two-rotational range to the right, the absolute rotational position specify device specifies the other one of the two possible absolute rotational positions as the absolute rotational position of the steering wheel.

8. An electric power steering apparatus according to claim 1, wherein the steering wheel is rotatable within a one-rotational range to the right from a neutral steering position, within a two-rotational range to the right beyond the one-rotational range to the right, within a one-rotational range to the left from the neutral steering position, and within a two-rotational range to the left beyond the one-rotational range to the left, and the absolute rotational position of the steering wheel, which is obtained from the steering angles and the motor electrical angle, is specified from among two possible absolute rotational positions, wherein the electric power steering apparatus further comprises:
   a vehicle wheel speed detecting device configured to detect a rotational speed of respective left and right vehicle wheels; and
   a steering direction judging device configured to judge a steering direction of the steering wheel on the basis of a difference between the rotational speeds of the left and right vehicle wheels detected by the vehicle wheel speed detecting device, wherein
the absolute rotational position specifying device specifies, based on the steering direction judged by the steering direction judging device, the absolute rotational position of the steering wheel from among the two possible absolute rotational positions.

9. An electric power steering apparatus:
a steering wheel;
a steering shaft connected to the steering wheel;
a steering angle detecting means for detecting a rotational angle of the steering shaft as a steering angle;
an electric motor for assisting, through a speed reduction gear mechanism, a steering operation performed by a steering mechanism connected to the steering shaft; and
a motor resolver for detecting a motor electrical angle indicating a rotational angle of the electric motor,
the electric power steering apparatus being capable of controlling the electric motor based on an absolute rotational position of the steering wheel, the absolute rotational position which is calculated based on the steering angle and the motor electrical angle, wherein:
at least one of a speed reduction gear ratio of the speed reduction gear mechanism and the number of pole pairs of the motor resolver is set in such a manner that a calculated value, which is obtained by multiplying the speed reduction gear ratio of the speed reduction gear mechanism with the number of pole pairs of the motor resolver, represents a non-integer having a numerical value of the decimal place, and
the electric power steering apparatus further comprises:
   an absolute rotational position specifying means for specifying an absolute rotational position of the steering wheel from among plural possible absolute rotational positions that are obtained based on the steering angle and the motor electrical angle.

* * * * *